US012750535B2

(12) United States Patent
Zhu

(10) Patent No.: US 12,750,535 B2
(45) Date of Patent: Sep. 29, 2026

(54) POINT CLOUD ENCODING METHOD, POINT CLOUD DECODING METHOD, AND RELATED DEVICE

(71) Applicant: TENCENT TECHNOLOGY (SHENZHEN) COMPANY LIMITED, Shenzhen (CN)

(72) Inventor: Wenjie Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/918,603

(22) Filed: Oct. 17, 2024

(65) Prior Publication Data

US 2025/0039470 A1 Jan. 30, 2025

Related U.S. Application Data

(63) Continuation of application No. PCT/CN2023/079143, filed on Mar. 1, 2023.

(30) Foreign Application Priority Data

Jun. 17, 2022 (CN) ......................... 202210690211.7

(51) Int. Cl.
*H04N 19/54* (2014.01)
*H04N 19/593* (2014.01)
*H04N 19/96* (2014.01)

(52) U.S. Cl.
CPC ........... *H04N 19/96* (2014.11); *H04N 19/593* (2014.11)

(58) Field of Classification Search
CPC .... H04N 19/96; H04N 19/593; H04N 19/597; H04N 19/70; H04L 65/75; H04L 65/60; G06T 9/004; G06T 9/40
See application file for complete search history.

(56) References Cited

U.S. PATENT DOCUMENTS 7,966,347 B2 * 6/2011 McNutt ............... G06F 11/3428 707/778
8,676,937 B2 * 3/2014 Rapaport .............. H04L 67/306 709/219

(Continued)

FOREIGN PATENT DOCUMENTS

EP 4071717 A1 * 10/2022 ............... G06T 9/00
EP 4395320 A1 * 7/2024 ........... H04N 19/172
WO 2021/182937 A1 9/2021

OTHER PUBLICATIONS

International Search Report for International Application No. PCT/CN2023/079143 dated Jun. 7, 2023.

(Continued)

*Primary Examiner* — Philip P. Dang
(74) *Attorney, Agent, or Firm* — Sughrue Mion, PLLC

(57) ABSTRACT

A point cloud encoding method, performed by an encoding device, includes: obtaining point cloud data, including one or more point cloud groups, wherein the one or more point cloud groups include first points; determining one or more starting points for the one or more point cloud groups; constructing one or more single-chain predictive trees for the one or more point cloud groups based on the one or more starting points; encoding the first points based on the one or more single-chain predictive trees; and transmitting the encoded first points.

18 Claims, 13 Drawing Sheets

(56) References Cited

U.S. PATENT DOCUMENTS

| | | | | |
|---|---|---|---|---|
| 8,755,287 | B2 * | 6/2014 | Nakashima | H04L 49/40 370/254 |
| 9,544,799 | B2 * | 1/2017 | Okita | H04L 43/028 |
| 9,722,920 | B2 * | 8/2017 | Nakashima | H04L 45/48 |
| 10,334,501 | B2 * | 6/2019 | Tohzaka | H04W 40/02 |
| 10,598,788 | B1 * | 3/2020 | Dussan | G01S 17/93 |
| 10,796,458 | B2 * | 10/2020 | Melkote Krishnaprasad | H04N 19/94 |
| 10,911,799 | B2 * | 2/2021 | Boyce | G06T 15/04 |
| 11,030,008 | B2 * | 6/2021 | Jeon | G06F 9/5022 |
| 11,057,631 | B2 * | 7/2021 | Boyce | H04N 19/196 |
| 11,093,252 | B1 * | 8/2021 | Agarwal | G06F 3/065 |
| 11,197,027 | B2 * | 12/2021 | Han | H04N 19/184 |
| 11,206,426 | B2 * | 12/2021 | Sugio | H04N 19/597 |
| 11,210,815 | B2 * | 12/2021 | Yeung | G06N 3/0464 |
| 11,310,525 | B2 * | 4/2022 | Lasserre | H04N 19/184 |
| 11,321,350 | B2 * | 5/2022 | Schrum | G06F 16/23 |
| 11,348,260 | B2 * | 5/2022 | Cai | G06T 7/50 |
| 11,443,459 | B2 * | 9/2022 | Sugio | G06T 9/40 |
| 11,553,396 | B2 * | 1/2023 | Matsuura | H04W 4/38 |
| 11,575,936 | B2 * | 2/2023 | Wang | H04N 19/597 |
| 11,625,865 | B2 * | 4/2023 | Wang | G06T 9/004 382/238 |
| 11,625,866 | B2 * | 4/2023 | Flynn | H04N 19/46 382/240 |
| 11,677,948 | B2 * | 6/2023 | Besenbruch | G06N 3/084 375/240.03 |
| 11,701,771 | B2 * | 7/2023 | Mousavian | G06N 3/088 700/245 |
| 11,856,207 | B2 * | 12/2023 | Lasang | H04N 19/159 |
| 11,887,345 | B2 * | 1/2024 | Mammou | G06T 9/40 |
| 11,990,229 | B2 * | 5/2024 | Gilmore | G16H 40/20 |
| 12,159,437 | B2 * | 12/2024 | Yang | G06T 9/001 |
| 12,190,549 | B2 * | 1/2025 | Kuma | H04N 19/119 |
| 2003/0133429 | A1 * | 7/2003 | Choi | H04B 7/2684 370/441 |
| 2009/0079876 | A1 * | 3/2009 | Takeshima | G06T 3/4069 348/E5.062 |
| 2017/0169174 | A1 * | 6/2017 | Yeung | G16H 50/70 |
| 2018/0307426 | A1 * | 10/2018 | Sakai | G06F 3/0689 |
| 2019/0156507 | A1 * | 5/2019 | Zeng | G06F 16/29 |
| 2020/0043121 | A1 * | 2/2020 | Boyce | G06T 15/005 |
| 2020/0219286 | A1 * | 7/2020 | Sinharoy | G06T 7/174 |
| 2020/0296423 | A1 * | 9/2020 | Chao | H04N 19/42 |
| 2021/0104013 | A1 * | 4/2021 | Hur | G06T 9/001 |
| 2022/0078436 | A1 * | 3/2022 | Kim | H04N 19/137 |
| 2022/0210471 | A1 * | 6/2022 | Zhang | H04N 19/136 |
| 2022/0245574 | A1 * | 8/2022 | Cella | G06Q 10/087 |
| 2022/0245863 | A1 * | 8/2022 | Kuma | H04N 19/119 |
| 2022/0343550 | A1 * | 10/2022 | Yang | G06F 16/22 |
| 2022/0358686 | A1 * | 11/2022 | Lasserre | H04N 19/96 |
| 2023/0281878 | A1 * | 9/2023 | Oh | H04N 19/597 375/240.01 |
| 2023/0334719 | A1 * | 10/2023 | Lee | H04N 19/96 |
| 2024/0056604 | A1 * | 2/2024 | Kuma | H04N 19/597 |
| 2024/0078690 | A1 * | 3/2024 | Reaungamornrat | G16H 30/20 |
| 2024/0196012 | A1 * | 6/2024 | Oh | H04N 19/54 |
| 2024/0276013 | A1 * | 8/2024 | Oh | H04N 19/119 |
| 2024/0364924 | A1 * | 10/2024 | Oh | H04N 19/139 |

OTHER PUBLICATIONS

Written Opinion of the International Searching Authority for International Application No. PCT/CN2023/079143 dated Jun. 7, 2023.
First Chinese Office Action for Chinese Application No. 202210690211.7 dated Feb. 4, 2023.
Second Chinese Office Action for Chinese Application No. 202210690211.7 dated Aug. 5, 2023.
Extended EP Search Report issued Sep. 11, 2025 in EP Application No. 23822680.7.
Lasserre et al., A Point Cloud Codec for Lidar Data with Very Low Complexity and Latency, 134. MPEG Meeting, Apr. 26, 2021-Apr. 30, 2021. Online; (Motion Picture Expert Group or ISO/IEC JTC1/SC29/WG11), 17 pages.

* cited by examiner

POINT CLOUD ENCODING METHOD, POINT CLOUD DECODING METHOD, AND RELATED DEVICE

CROSS-REFERENCE TO RELATED APPLICATIONS

This application is a continuation application of International Application No. PCT/CN2023/079143 filed on Mar. 1, 2023, which claims priority to Chinese Patent Application No. 202210690211.7 filed with the China National Intellectual Property Administration on Jun. 17, 2022, the disclosures of each being incorporated by reference herein in their entireties.

FIELD

The disclosure relates to the field of computer technologies, to encoding and decoding fields, and in particular, to a point cloud encoding method, a point cloud decoding method, a point cloud processing apparatus, a computer device, and a computer-readable storage medium.

BACKGROUND

Point cloud data is a set of points that are obtained by capturing data from surfaces of an object by a measuring instrument. Point cloud data may be applied in aspects such as autonomous driving, high-precision maps, and virtual reality. However, because point cloud data may includes tens of thousands of points to hundreds of millions of three-dimensional points, for example, the technology poses challenges to storage, processing, transmission, and displaying of data, and it may be difficult for both current storage resources and transmission bandwidths to withstand the point cloud data. Therefore, improved solutions for encoding point cloud data before storing or transmitting the point cloud data may help address these challenges.

SUMMARY

Provided are a point cloud encoding method, a point cloud decoding method, and related devices, capable of constructing a predictive tree for point cloud data based on a plurality of starting points.

According to some embodiments, a point cloud encoding method, performed by an encoding device, includes: obtaining point cloud data, including one or more point cloud groups, wherein the one or more point cloud groups include a first plurality of points; determining one or more starting points for the one or more point cloud groups; constructing one or more single-chain predictive trees for the one or more point cloud groups based on the one or more starting points; encoding the first plurality of points based on the one or more single-chain predictive trees; and transmitting the encoded first plurality of points.

According to some embodiments, a point cloud encoding apparatus, configured in an encoding device, includes: at least one memory configured to store computer program code; and at least one processor configured to read the program code and operate as instructed by the program code, the program code including: obtaining code configured to cause at least one of the at least one processor to obtain point cloud data including one or more point cloud groups, wherein the one or more point cloud groups include a first plurality of points; determining code configured to cause at least one of the at least one processor to determine one or more starting points for the one or more point cloud groups; constructing code configured to cause at least one of the at least one processor to construct one or more single-chain predictive trees for the one or more point cloud groups based on the one or more starting points; encoding code configured to cause at least one of the at least one processor to encode the first plurality of points based on the one or more single-chain predictive trees; and transmitting code configured to cause at least one of the at least one processor to transmit the encoded first plurality of points.

According to some embodiments, a non-transitory computer-readable storage medium, storing computer code which, when executed by at least one processor, causes the at least one processor to at least: obtain point cloud data including one or more point cloud groups, wherein the one or more point cloud groups include a first plurality of points; determine one or more starting points for the one or more point cloud groups; construct one or more single-chain predictive trees for the one or more point cloud groups based on the one or more starting points; encode the first plurality of points based on the one or more single-chain predictive trees; and transmit the encoded first plurality of points.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DESCRIPTION OF EMBODIMENTS

Figure 1:
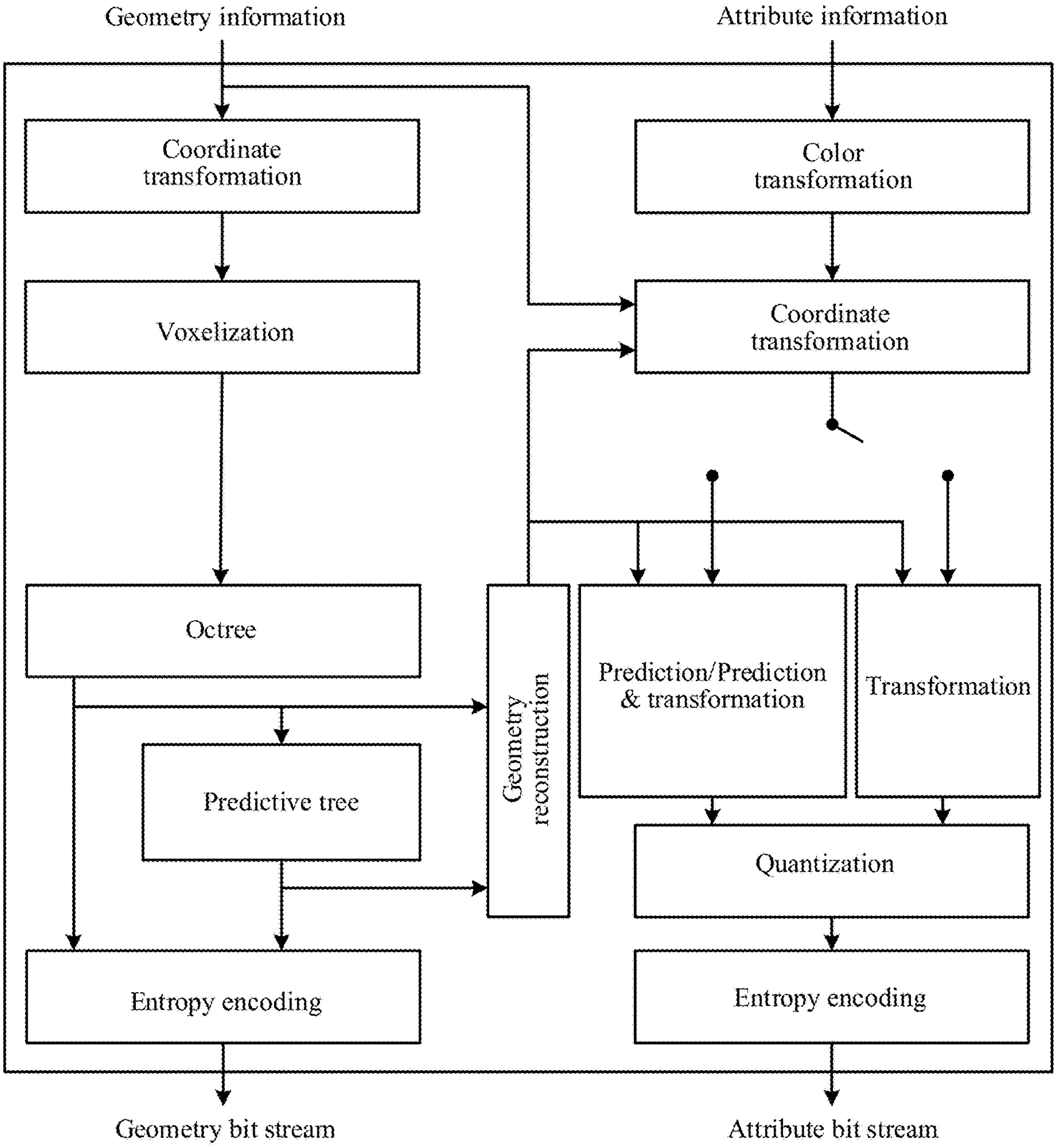
FIG. 1 is a diagram of a structure of an encoding framework according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. For example, the phrase "at least one of A, B, and C" includes within its scope "only A", "only B", "only C", "A and B", "B and C", "A and C" and "all of A, B, and C."

For a clearer understanding of technical solutions provided in some embodiments, some terms used some embodiments are first described herein.

I. Point Cloud Data

Point cloud data may be a set of discrete points that are irregularly distributed in space and that express a spatial structure and a surface attribute of a three-dimensional object or a three-dimensional scene. Point cloud data may include a plurality of points, and each point has geometry information and attribute information. Geometry information may also be referred to as three-dimensional location information. Geometry information of any point may be three-dimensional coordinates (x, y, z) of the point, and may include coordinates of the point with reference to coordinate axes of a three-dimensional coordinate system, for example, an X-coordinate of x, a Y-coordinate of y, and a Z-coordinate of z. Attribute information of any point may include at least one of color information, material information, or laser reflection intensity information (which may also be referred to as reflectivity). Points in point cloud data may have the same quantity of types of attribute information. For example, each point in point cloud data may have two types of attribute information: color information and laser reflection intensity information. Each point in point cloud data may have three types of attribute information: color information, material information, and laser reflection intensity information. In addition, point cloud data may be classified into different categories according to different classification criteria. For example, point cloud data may be classified into dense point clouds and sparse point clouds based on manners of obtaining point cloud data. Point cloud data may be classified into static point clouds and dynamic point clouds based on timing types of point cloud data.

II. Point Cloud Compression (PCC)

Point cloud compression is a process of encoding point cloud data to obtain a compressed bit stream (or referred to as an encoded bit stream) of the point cloud data. Point cloud compression may include geometry information encoding and attribute information encoding. Point cloud compression technologies may be classified into geometry-based point cloud compression and projection-based point cloud compression for different types of point cloud data. Geometry-based point cloud compression (G-PCC) in moving picture experts group (MPEG) and a point cloud compression standard AVS-PCC in audio video coding standard (AVS) are used as examples for description.

The G-PCC and the AVS-PCC are both developed for static, sparse point clouds, and their encoding frameworks may be similar. As shown in FIG. 1, a geometry information encoding process and an attribute information encoding process may be included. In the geometry information encoding process, geometry information of each point in point cloud data is encoded to obtain a geometry bit stream. In the attribute information encoding process, attribute information of each point in the point cloud data is encoded to obtain an attribute bit stream. The geometry bit stream and the attribute bit stream collectively make up a compressed bit stream of the point cloud data.

1. For the Geometry Information Encoding Process, Refer to the Following Description for Operations and Processing:

Pre-processing: Coordinate transformation and voxelization may be included. Through scaling and translation operations, point cloud data in three-dimensional space is converted into integers, and a minimum geometric location of the point cloud data is moved to a coordinate origin.

Geometry encoding: A plurality of schemes may be included, such as octree geometry encoding, predictive tree geometry encoding, and trisoup geometry encoding. Different schemes may be used for point cloud data under different conditions. The following describes the three schemes mentioned above.

Figure 2:
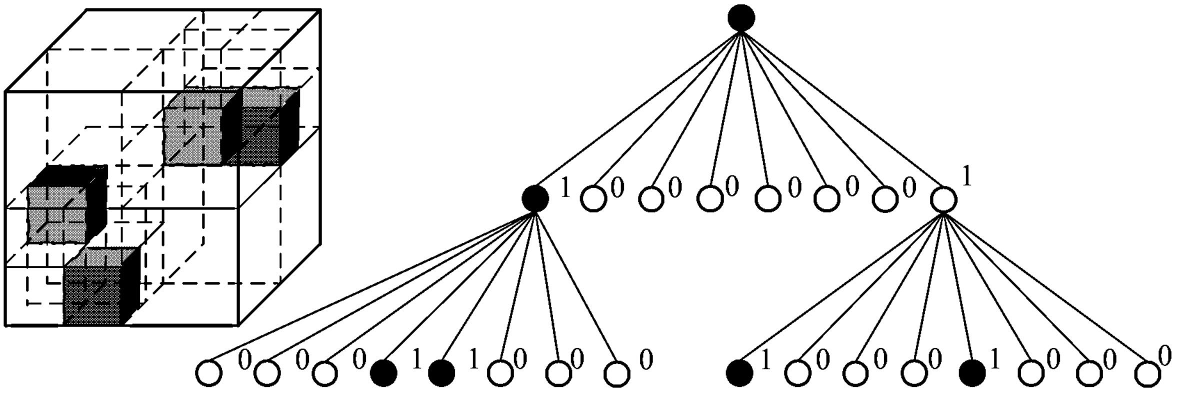
FIG. 2 is a diagram of an encoding structure of an octree according to some embodiments.

Octree geometry encoding: An octree is a tree data structure. For point cloud data in 3D space, an octree is obtained by evenly partitioning a preset bounding box level by level, with each node having eight child nodes. By using "1" to indicate that a child node of the octree is occupied and "0" to indicate that a child node of the octree is not occupied, as shown in FIG. 2, occupancy code information is obtained and used as a bit stream of geometry information of a point cloud. The bounding box mentioned above is an algorithm for finding space occupied by a set of discrete points. A complex geometric object may be approximated by a geometric object with a slightly larger volume and fewer characteristics (referred to as a bounding box).

At present, constructing an octree based on a Morton order is supported, for example, 3D coordinate information (for example, geometry information) of point cloud data is converted into corresponding Morton codes by querying a Morton order table. Based on a position of each Morton code, a corresponding point at each level of the octree is obtained. Point cloud data may be represented by an octree that is obtained through partitioning, and different processing procedures may be adopted for geometry information and attribute information. The Morton order, also referred to as a Morton curve, is a recursive space partitioning technology, which can well map three-dimensional space to a one-dimensional spatial curve and preserve good locality.

Predictive tree geometry encoding: Distance relationships between three-dimensional coordinates of points in point cloud data are analyzed; with a criterion met, the points may be connected one by one to form a single-chain or multi-chain tree structure; residuals may be calculated based on coordinates of parent nodes and child nodes that are connected; and encoding may be performed based on the residuals, index values that may exist, and a calculation method.

A process of constructing a predictive tree based on a plurality of points included in point cloud data may be a process of solving a traveling salesman problem (TSP). The TSP problem is a classic combinatorial optimization problem. The classic TSP may be described as follows: A commodity salesman goes to several cities to promote commodities. The salesman starts from a city, and needs to return to the starting place after traveling through all the cities. How does the salesman select routes to keep the overall journey shortest? From a perspective of a graph theory, the problem may be to find a cycle with a minimum weight in a weighted complete undirected graph. Because solutions to the problem may include all permutations of all vertices, a combinatorial explosion may occur as a quantity of vertices increases. The TSP problem is an NP-complete problem. Because the TSP problem frequently occurs in fields such as transportation, design of circuits on circuit boards, and logistics and delivery, scholars have conducted extensive research on the problem. Researchers have attempted to solve the problem based on exact algorithms, such as branch and bound algorithms, linear programming algorithms, dynamic programming algorithms, and the like. However, as a scale of the problem increases, exact algorithms may be unable to solve the problem. In later research, scholars have attempted to use approximation algorithms or heuristic algorithms, such as genetic algorithms, simulated annealing algorithms, ant colony algorithms, tabu search algorithms, greedy algorithms, neural networks, and the like.

For example, if a TSP is modeled by using a weighted undirected graph, cities are vertices in the graph, roads are edges in the graph, and a distance between two cities is a length of an edge between two corresponding vertices. This is a minimization problem in which a starting point and an ending point are both at a vertex and each vertex is visited exactly once. The model may be a complete graph (for example, vertices in each vertex pair are connected by an edge). If no path exists between two cities, the graph may be completed by adding an excessively long edge, without affecting computation of a cycle. In a symmetric TSP problem, a forward path distance and a backward path distance between two cities are equal, so an undirected graph is formed. The symmetry reduces a quantity of solutions by half. In an asymmetric TSP problem, a forward path or a backward path between two cities may be absent, or a forward path distance and a backward path distance are different, so a directed graph is formed. Traffic accidents, one-way streets, a difference between a ticket price of an A-to-B flight and a ticket price of a B-to-A flight, and the like are all examples of the symmetry being broken.

Figure 3:
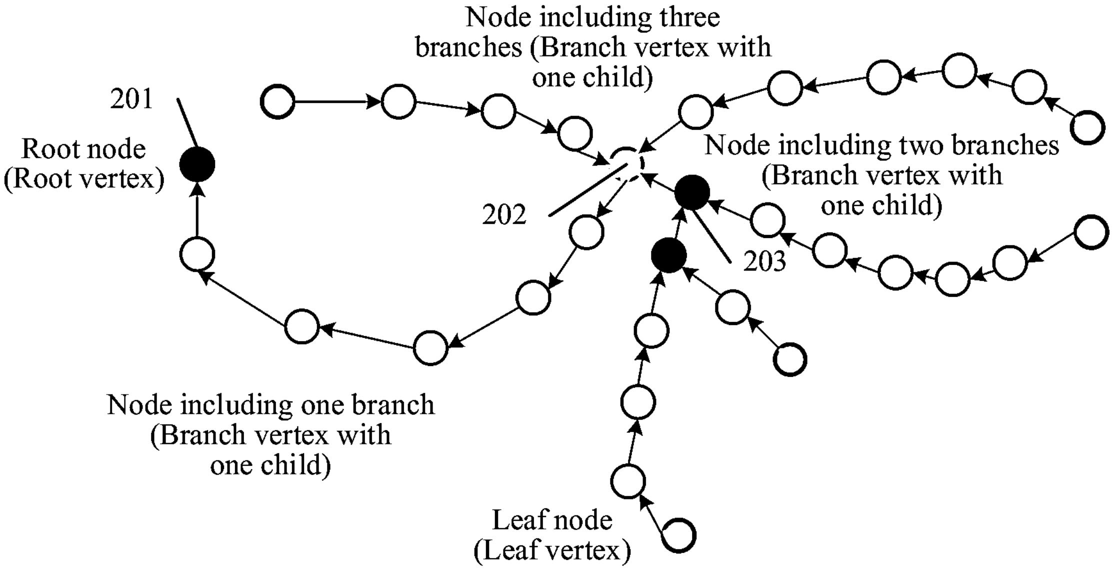
FIG. 3 is a diagram of an encoding structure of a multi-chain predictive tree according to some embodiments.
Figure 4:
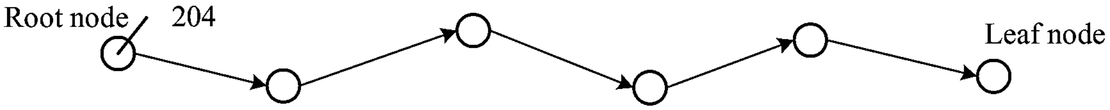
FIG. 4 is a diagram of a structure of a single-chain predictive tree according to some embodiments.

For a diagram of an encoding structure of an MPEG multi-chain predictive tree, refer to FIG. 3. The multi-chain predictive tree uses a point 201 as a starting point, and a plurality of points are connected to the starting point in sequence. At a point 202, there appear three branch chains with the point 202 as a starting point. From left to right and from top to bottom, the three branch chains include a first branch chain, a second branch chain, and a third branch chain. The first branch chain and the second branch chain are both single chains. At a point 203 on the third branch chain, there appear two branch chains with the point 203 as a starting point. For a diagram of an encoding structure of an AVS single-chain predictive tree, refer to FIG. 4. The single-chain predictive tree starts from a starting point 204. All points included in point cloud data are connected to form a single-chain predictive tree. No branch chain exists in the single-chain predictive tree.

Trisoup geometry encoding: Based on point cloud blocks being obtained through partitioning, intersection points between point cloud surfaces and edges of the blocks are determined, and triangles are constructed. Geometry information is compressed by encoding locations of the intersection points. Point cloud blocks are obtained by partitioning three-dimensional space in which points in point cloud data reside. Each point cloud block includes a portion of the points in the point cloud data.

Geometry quantization: Quantization fineness may be determined by a quantizer parameter (QP). A larger QP value indicates that coefficients in a wider value range are to be quantized to the same output; this may result in a larger distortion and a lower bit rate. On the contrary, a smaller QP value indicates that coefficients in a narrower value range are to be quantized to the same output; this may result in a smaller distortion and a higher bit rate. In point cloud compression, quantization is performed directly on coordinate information of points.

Geometry entropy encoding: Statistical compression and encoding are performed on occupancy code information of an octree, and finally a binary (0 or 1) compressed bit stream is outputted. Statistical encoding is a lossless encoding scheme, which may reduce a bit rate for representing the same signal. A statistical encoding scheme may include content adaptive binary arithmetic coding (CABAC).

2. For the Attribute Information Encoding Process, Refer to the Following Description for Operations and Processing:

Attribute recoloring: In a case of lossy encoding, based on the geometry information being encoded, an encoding end needs to perform decoding and reconstruct the geometry information, for example, recover the geometry information of each point in the point cloud data. The original point cloud data is searched for the attribute information of one or more corresponding neighboring points, and the attribute information is used as attribute information of the reconstructed point.

Attribute transform encoding: Distance relationships between the geometry information are analyzed, real attribute information corresponding to a quantity of points may be transformed into transform coefficients by a transform matrix, and the transform coefficients may be encoded. There are three attribute transform encoding schemes: attribute predicting transform encoding, attribute lifting transform encoding, and region adaptive hierarchical transform encoding. The following describes the three schemes.

Attribute predicting transform encoding: A subset of points is selected based on distances. Point cloud data is partitioned into a plurality of different levels of detail (LoDs), to implement a coarse-to-fine point cloud representation. Bottom-up prediction may be implemented between adjacent levels. For example, attribute information of a point introduced to a fine level is predicted based on a neighboring point at a coarse level, to obtain a corresponding residual signal. Points at a lowest level are encoded as reference information.

Attribute lifting transform encoding: Based on adjacent LoD prediction, a policy of updating weights for neighboring points is introduced. Finally, a predictive attribute value of each point is obtained, and a corresponding residual signal is obtained.

Region adaptive hierarchical transform (RAHT) encoding: Based on RAHT being performed on attribute information, signals are transformed to a transform domain, and transform results are referred to as transform coefficients.

Attribute information quantization: Quantization fineness may be determined by a quantizer parameter. In attribute predictive encoding, entropy coding is performed on quantized prediction residual information. In attribute transform encoding and attribute predicting transform encoding, entropy coding is performed on quantized transform coefficients.

Attribute entropy coding: Runlength coding and arithmetic coding may be performed on the quantized prediction residual information or the quantized transform coefficients, to implement final compression. Likewise, corresponding information such as an encoding scheme and a quantizer parameter is also encoded by an entropy encoder.

III. Point Cloud Decoding

Point cloud decoding is a process of decoding a compressed bit stream of point cloud data to reconstruct the point cloud data. Point cloud decoding may be a process of reconstructing geometry information and attribute information of each point in the point cloud data based on a geometry bit stream and an attribute bit stream in the compressed bit stream. Based on the compressed bit stream of the point cloud data being obtained at a decoding end, for the geometry bit stream, entropy decoding is first performed to obtain information about various schemes, quantized geometry information, and quantized attribute information. The geometry information is dequantized to obtain reconstructed location information (for example, geometry information) of 3-dimensional (3D) points. For the attribute bit stream, entropy decoding is first performed to obtain quantized prediction residual information or a quantized transform coefficient of each point in the point cloud data. The quantized prediction residual information is dequantized to obtain reconstructed residual information. The quantized transform coefficients are dequantized to obtain reconstructed transform coefficients. Inverse transform is performed on the reconstructed transform coefficients to obtain reconstructed residual information. The attribute information of each point in the point cloud data can be reconstructed based on the reconstructed residual information of each point in the point cloud data. The reconstructed attribute information of the points in the point cloud data is sequentially mapped to the reconstructed geometry information on a one-to-one basis, to obtain reconstructed point cloud data.

Figure 5:
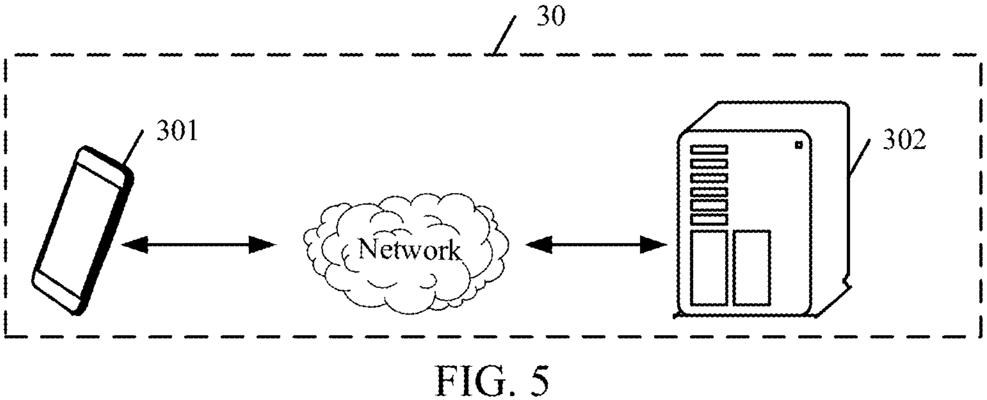
FIG. 5 is a diagram of an architecture of a point cloud encoding and decoding system according to some embodiments.

Based on the related descriptions of point cloud data, point cloud compression, and point cloud decoding, some embodiments provide a point cloud encoding and decoding system. As shown in FIG. 5, a point cloud encoding and decoding system 30 may include an encoding device 301 and a decoding device 302. The encoding device 301 or the decoding device 302 may be a terminal or a server. A communication connection may be established between the encoding device 301 and the decoding device 302. A terminal may be a smartphone, a tablet computer, a notebook computer, a desktop computer, a smart speaker, a smartwatch, a vehicle-mounted terminal, a smart television (TV), or the like, but is not limited thereto. A server may be a standalone physical server, or may be a server cluster or a distributed system that includes a plurality of physical servers, or may be a cloud server that provides cloud computing services such as cloud services, cloud databases, cloud computing, cloud functions, cloud storage, network services, cloud communication, middleware services, domain name services, security services, content delivery networks (CDNs), big data, and artificial intelligence platforms. For case of description, in some embodiments, an encoding device and an encoding end are not distinguished from each other, and likewise, a decoding device and a decoding end are not distinguished from each other.

Based on the point cloud encoding and decoding system shown in FIG. 5, some embodiments provide a predictive tree encoding and decoding scheme that is based on a plurality of starting points. In the predictive tree encoding and decoding scheme, a predictive tree encoding structure based on a plurality of starting points is provided and constructed, and encoding and decoding are performed on corresponding residuals of geometry information. The predictive tree encoding and decoding scheme includes a point cloud encoding scheme and a point cloud decoding scheme. The predictive tree encoding and decoding scheme may include, but is not limited to, the following operations:

Obtain point cloud data.

Point cloud data may be obtained in two manners: scene capture and generation by a device. Obtaining point cloud data through scene capture may be as follows: A capture device or a measuring instrument captures a visual scene in the real world to obtain point cloud data. The capture device may be a hardware component disposed in the encoding device 301. For example, a capture device is a camera or sensor of a terminal. The capture device may be a hardware apparatus connected to the encoding device 301, for example, a camera connected to a server. The capture device may be configured to provide the encoding device 301 with a service of obtaining point cloud data. The capture device may include but is not limited to any one of a camera device, a sensing device, or a scan device. A camera device may include a camera, a stereo camera, a light field camera, or the like. A sensing device may include a laser device, a radar device, or the like. A scan device may include a three-dimensional laser scan device or the like. Generating point cloud data by a device may be as follows: A virtual object production device generates point cloud data based on a virtual object (for example, a virtual three-dimensional object or a virtual three-dimensional scene obtained through three-dimensional modeling). A source of the point cloud data is not limited.

The point cloud data may include at least real geometry information of to-be-encoded points. The real geometry information of the to-be-encoded points in the point cloud data may be information about real spatial locations of the to-be-encoded points in three-dimensional space. For example, the information is coordinates of the to-be-encoded points in a three-dimensional coordinate system in the three-dimensional space. For example, if coordinate information of a to-be-encoded point in a three-dimensional coordinate system in three-dimensional space is (x, y, z), real geometry information of the to-be-encoded point is (x, y, z). Real geometry information of a plurality of to-be-encoded points can show spatial positional relationships between the plurality of to-be-encoded points in the three-dimensional space.

Encode the point cloud data to obtain an encoded bit stream.

Based on the capture device obtaining the point cloud data, the encoding device 301 may divide the to-be-encoded point cloud data into L point cloud groups, where L is an integer greater than or equal to 1. The encoding device 301 creates, in units of point cloud groups, a single-chain predictive tree for each point cloud group. The single-chain predictive trees of the L point cloud groups are connected in an order in which the L point cloud groups are obtained through division, to obtain a target predictive tree of the point cloud data. Compared with constructing a predictive tree for entire point cloud data, constructing a single-chain predictive tree for each point cloud group can help reduce time for constructing a predictive tree for point cloud data, increasing efficiency of constructing the predictive tree. The target predictive tree of the point cloud data may be encoded, to obtain encoded point cloud data and further obtain the encoded bit stream, and the encoded bit stream is transmitted to the decoding device 302. In the process of constructing a single-chain predictive tree for each point cloud group, a plurality of starting points may be first selected for the point cloud group, and the plurality of starting points each may serve as a search starting point to obtain a branch chain corresponding to each starting point. Finally, the plurality of branch chains corresponding to the plurality of starting points are connected to obtain the single-chain predictive tree of the point cloud group. In the manner of constructing a single-chain predictive tree based on a plurality of starting points, an efficient predictive tree structure can be implemented, associations between adjacent unordered points in the three-dimensional space can be improved, and efficiency of encoding the point cloud data can be increased.

Decode the to-be-decoded point cloud data to reconstruct the point cloud data.

Based on receiving the encoded bit stream, the decoding device 302 may obtain the to-be-decoded point cloud data (for example, the encoded point cloud data) from the encoded bit stream. Starting point parsing may be performed on the to-be-decoded point cloud data, to determine reconstructed geometry information of the starting point of the point cloud data. The starting point may be a to-be-decoded point that is in the first position in the point cloud data. Geometry prediction is performed for each to-be-decoded point in the point cloud data based on a geometry decoding scheme determined for the point cloud data and the reconstructed geometry information of the starting point, to obtain predicted geometry information of each point. Geometry decoding is performed on each point to obtain reconstructed residual information of each point. Reconstructed geometry information of each point is determined based on the predicted geometry information and reconstructed residual information of each point. The point cloud data may be reconstructed at the decoding end. In the foregoing process, starting point parsing is performed on the point cloud data. The reconstructed geometry information of the starting point of the point cloud data is directly obtained. For example, the reconstructed geometry information of the starting point may be determined quickly. In addition, the reconstructed residual information of each point is finally obtained by performing geometry decoding on each to-be-decoded point in the point cloud data. With this manner compared with direct reconstruction of the reconstructed geometry information of each point, an amount of data to be decoded can be reduced during geometry information decoding, because residual data is of a small amount. This further improves efficiency of decoding the point cloud data.

The point cloud encoding and decoding system described in some embodiments is intended to describe the technical solutions in some embodiments more clearly, but does not constitute a limitation on the technical solutions provided in some embodiments. A person of ordinary skill in the art may know that the technical solutions provided in some embodiments are also applicable to similar technical problems as a system architecture evolves and a new service scenario emerges.

Based on the related description of the predictive tree encoding and decoding scheme, the following separately describes a point cloud encoding method and a point cloud decoding method in some embodiments with reference to the accompanying drawings.

Figure 6:
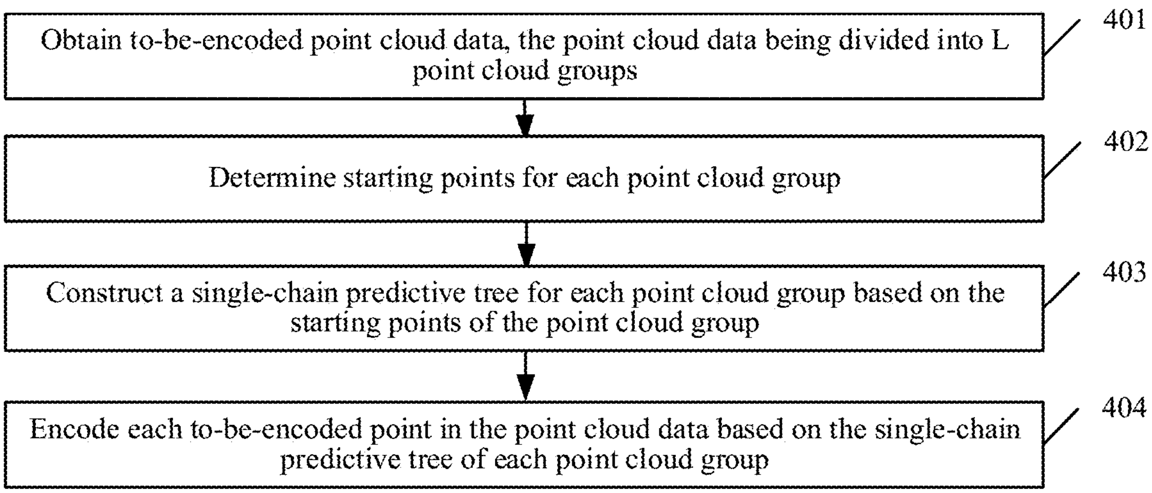
FIG. 6 is a schematic flowchart of a point cloud encoding method according to some embodiments.

Some embodiments provide a point cloud encoding method. For a procedure of the point cloud encoding method, refer to FIG. 6. The point cloud encoding method may be performed by the encoding device 301 in the point cloud encoding and decoding system 30 shown in FIG. 5. As shown in FIG. 6, the point cloud encoding method may include the following operations 401 to 404:

401: Obtain to-be-encoded point cloud data, the point cloud data being divided into L point cloud groups, and L being an integer greater than or equal to 1.

The to-be-encoded point cloud data may be a set of points obtained by performing digital capture on surfaces of a real three-dimensional object. Point cloud data is a set in units of points. Each point included in point cloud data has geometry information and attribute information, which may be configured for representing surface characteristics of a real three-dimensional object. When a target object (for example, any object) has a requirement of analyzing surface characteristics of a surface of a three-dimensional object or transmitting surface characteristics of a surface of an object, a capture device may be used to scan the surface of the three-dimensional object to obtain to-be-encoded point cloud data. The to-be-encoded point cloud data includes a plurality of to-be-encoded points captured from the surface of the three-dimensional object.

The to-be-encoded point cloud data may be divided, for example, the plurality of to-be-encoded points included in the point cloud data are divided into different point cloud groups. The point cloud groups may include the same quantity or different quantities of to-be-encoded points. The following describes, with reference to FIG. 7, an implementation process of dividing the to-be-encoded point cloud data into the L point cloud groups.

Figure 7:
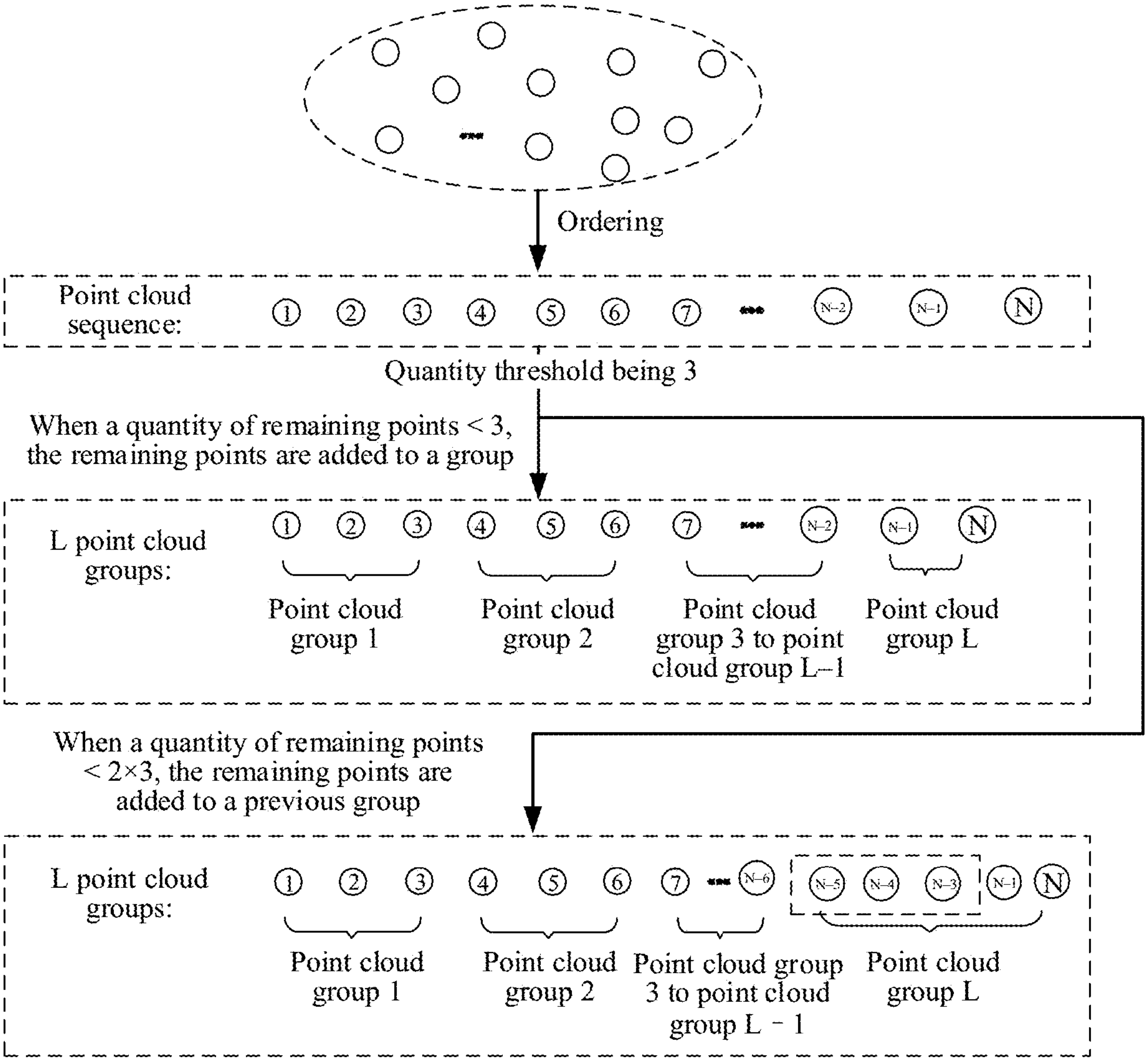
FIG. 7 is a diagram of dividing to-be-encoded point cloud data into groups according to some embodiments.

As shown in FIG. 7, it is assumed that point cloud data includes N to-be-encoded points, where N is an integer greater than 1. The N to-be-encoded points included in the to-be-encoded point cloud data may be ordered first to obtain a point cloud sequence. A point cloud sequence may be obtained in an order that includes but is not limited to a Morton order or an original order. (1) A Morton order may be obtained by ordering Morton codes based on geometry information of to-be-encoded points included in point cloud data. For example, 3D coordinate information (for example, the geometry information mentioned above) of the to-be-encoded points included in the point cloud data is converted, by querying a Morton order table, into Morton codes corresponding to the to-be-encoded points, and the Morton codes are ordered to obtain the Morton order corresponding to the point cloud data. (2) An original order may be an order in which to-be-encoded points are inputted when to-be-encoded point cloud data is inputted to an encoding device. The original order may include an order in which points are scanned when an object surface is scanned, or may include an order that is of points in point cloud data and that is customized by a target object (for example, a coding person). A manner of determining an original order is not limited.

An encoding device obtains a quantity threshold. The quantity threshold may be customized according to a data division requirement of the target object. Finally, based on an arrangement order of the to-be-encoded points in the point cloud sequence, a target quantity of adjacent points are added to a point cloud group to obtain the L point cloud groups. The quantity threshold includes the target quantity, and may be configured to indicate adding the target quantity of adjacent to-be-encoded points in the point cloud sequence to a point cloud group. For example, if a quantity threshold is 100, a target quantity included in the quantity threshold is 100. Based on an arrangement order of to-be-encoded points in a point cloud sequence, every 100 adjacent to-be-encoded points may be added to a point cloud group to obtain L point cloud groups.

A quantity of the to-be-encoded points included in the point cloud sequence may not be an integer multiple of the target quantity. For example, a quantity of to-be-encoded points included in a point cloud sequence is 11, and a target quantity is 3. A relationship between the quantity of the to-be-encoded points and the target quantity may be 11=3×3+2. Based on every three adjacent points being added to a cloud point group based on an arrangement order of the points in the point cloud sequence, there may be two points remaining in the point cloud sequence that are not added to a point cloud group. Some embodiments provide solutions for adding a remaining point to a point cloud group.

In some embodiments, when an $(L-1)^{th}$ point cloud group is obtained through division, if a quantity of ungrouped points remaining in the point cloud sequence is less than the target quantity, the remaining ungrouped points are added to an $L^{th}$ point cloud group. A quantity of to-be-encoded points included in the $L^{th}$ point cloud group may be the quantity of the remaining ungrouped points that is less than the target quantity. For example, when the quantity of the ungrouped points remaining in the point cloud sequence is less than the quantity threshold, the point cloud group made up of the remaining ungrouped points may be used as the last point cloud group. As shown in FIG. 7, when an $(L-1)^{th}$ point cloud group is obtained through division, there are two ungrouped points remaining in the point cloud sequence. The two remaining points are added to an $L^{th}$ point cloud group. The $L^{th}$ point cloud group may include two to-be-encoded points.

In some embodiments, when an $L^{th}$ point cloud group is obtained through division, if a quantity of ungrouped points remaining in the point cloud sequence is less than the target quantity, the remaining ungrouped points are added to the $L^{th}$ point cloud group. A quantity of to-be-encoded points included in the $L^{th}$ point cloud group may be as follows: the target quantity+the quantity of the remaining ungrouped points that is less than the target quantity. For example, when the quantity of the ungrouped points remaining in the point cloud sequence is less than the quantity threshold, the remaining ungrouped points may be added to the last point cloud group obtained through division. As shown in FIG. 7, when an $L^{th}$ point cloud group is obtained through division, there are two ungrouped points remaining in the point cloud sequence. The two remaining points are added to the $L^{th}$ point cloud group. The $L^{th}$ point cloud group may include five to-be-encoded points.

402: Determine starting points for each point cloud group, a quantity of the starting points of each point cloud group being greater than 1.

A starting point of a point cloud group is a search starting point used for constructing a single-chain predictive tree for the point cloud group. A search starting point may be understood as a head point on a chain, for example, a point in the first position (or referred to as a head position) on the chain (for example, a path obtained by connecting a plurality of points in sequence). When a point is determined as a search starting point, it is determined to search for, with the point as a reference, a to-be-encoded point in a point cloud group. The to-be-encoded point is connected to a branch chain that starts with the search starting point. The branch chain with a starting point as the search starting point may be formed. Further, when a quantity of starting points of a point cloud group is greater than 1, each starting point may be used as a search starting point, to obtain a corresponding branch chain of each starting point through search. A predictive tree of the point cloud group is obtained by connecting the branch chains. In a manner of determining a plurality of starting points for each point cloud group to construct a plurality of branch chains and finally constructing a predictive tree for the point cloud group based on the plurality of branch chains, the branch chains are synchronously constructed based on the starting points. Compared with constructing a predictive tree for a point cloud group based on a single starting point, the process of synchronously constructing the branch chains based on the starting points can help reduce time for constructing a predictive tree. This increases efficiency of constructing the predictive tree and implements an efficient predictive tree structure. Based on a quantity of starting points of a point cloud group being greater than 1, a plurality of searches may be performed with the starting points as references, to construct a single-chain predictive tree. For example, points in the point cloud group are connected, based on geometric distance relationships between the points and each starting point, to form a single-chain predictive tree. This can improve associations between unordered points in the point cloud group and each starting point, implementing an efficient single-chain predictive tree structure.

The following describes several manners of determining a starting point of a point cloud group provided in some embodiments.

Figure 8:
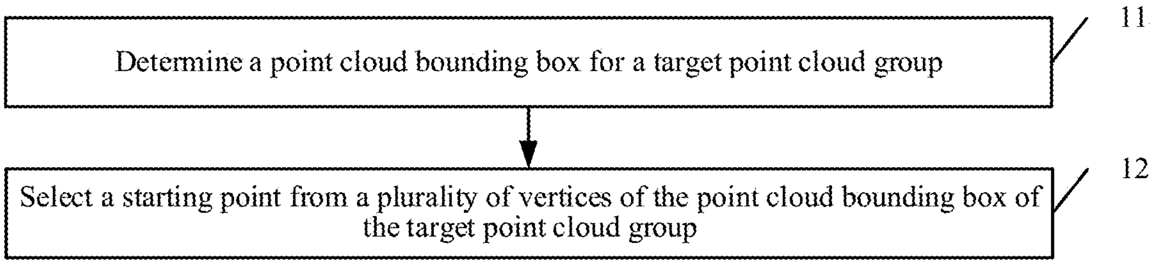
FIG. 8 is a diagram of selecting a starting point from a plurality of vertices of a point cloud bounding box according to some embodiments.

Selecting a starting point from a plurality of vertices of a point cloud bounding box of a point cloud group. It is assumed that any one of the L point cloud groups is a target point cloud group. As shown in FIG. 8, an implementation process of selecting a starting point for the target point cloud group may include operations 11 and 12.

11: Determine a point cloud bounding box for the target point cloud group. In consideration that the target point cloud group is obtained by dividing entire point cloud data, the point cloud bounding box of the target point cloud group may be a bounding box of octree nodes. The point cloud bounding box of the target point cloud group includes a three-dimensional spatial body that encompasses all points in the target point cloud group, such as a smallest cuboid, a smallest cube, or a smallest polyhedron (for example, a decahedron). A process of constructing the point cloud bounding box of the target point cloud group may include the following:

First, determine an origin of the point cloud bounding box of the target point cloud group based on real geometry information of to-be-encoded points in the target point cloud group. It is assumed that floating-point coordinate information of a $k^{th}$ point in the target point cloud group is expressed as $(x^k, y^k, z^k)$. k is a quantity of the to-be-encoded points in the target point cloud group, and k=0, 1, 2, . . . , k−1. For example, when k=2, coordinate information of the point is expressed as $(x^2, y^2, z^2)$. The determining an origin of the point cloud bounding box of the target point cloud group based on real geometry information of points in the target point cloud group may include (1) and (2) below, for example.

(1) Determine a coordinate point $(x^{min}, y^{min}, z^{min})$ with a minimum value in each of an x-direction, a y-direction, and a z-direction based on the real geometry information of the points in the target point cloud group. $x^{min}$ is a minimum of values of the to-be-encoded points in the target point cloud group in the x-direction. $y^{min}$ is a minimum of values of the to-be-encoded points in the target point cloud group in the y-direction. $z^{min}$ is a minimum of values of the to-be-encoded points in the target point cloud group in the z-direction. Formulas for calculating $x^{min}$, $y^{min}$, and $z^{min}$ are as follows, respectively:

$$x^{min} = \min(x^0, x^1, \ldots, x^{k-1});$$
$$y^{min} = \min(y^0, y^1, \ldots, y^{k-1});\ z^{min} = \min(z^0, z^1, \ldots, z^{k-1})$$

In the preceding formulas, $\min(s^0, s^1, \ldots, s^{sk-1})$ is a function for finding a minimum value, and means finding a minimum value from current inputs.

(2) Calculate the origin $(x^{origin}, y^{origin}, z^{origin})$ of the point cloud bounding box of the target point cloud group based on the coordinate point $(x^{min}, y^{min}, z^{min})$ with the minimum values. The origin coordinates of $x^{origin}$, $y^{origin}$, and $z^{origin}$ may be calculated by using the following calculation formulas, respectively:

$$x^{origin} = \mathrm{int}(\mathrm{floor}(x^{min}));\ y^{origin} = \mathrm{int}(\mathrm{floor}(y^{min}));\ z^{origin} = \mathrm{int}(\mathrm{floor}(z^{min}))$$

The int(s) function and the floor(s) function are both rounding functions. A rounding principle of the int(s) function is rounding a number down to a nearest integer, and a largest integer less than or equal to s may be returned. For example, int (7.3)=7. The rounding function floor(s) may return a value that is less than or equal to s and that is a largest multiple of a specified base. For example, floor (23,3) indicates that a value of 21 that is less than or equal to 23 and that is a largest integer multiple of 3 needs to be returned.

Calculate a dimension of the point cloud bounding box in each direction in a three-dimensional coordinate system based on the origin of the point cloud bounding box and the real geometry information of the to-be-encoded points in the target point cloud group, to determine the point cloud bounding box of the target point cloud group. The dimensions of the point cloud bounding box in the x-direction, the y-direction, and the z-direction may be calculated by using the following calculation formulas, respectively:

$$BoudingBoxSize_x = \mathrm{int}(x^{max} - x^{origin}) + 1;$$
$$BoundingBoxSize_y = \mathrm{int}(y^{max} - y^{origin}) + 1;$$
$$BoundingBoxSize_z = \mathrm{int}(z^{max} - z^{origin}) + 1$$

In the preceding formulas, the int(s) function is a rounding-down function. For a related description of the int(s) function, refer to the foregoing related description. A coordinate point $(x^{max}, y^{max}, z^{max})$ is a point with a maximum value in each of the x-direction, the y-direction, and the z-direction. $x^{max}$ is a maximum of values of the to-be-encoded points in the target point cloud group in the x-direction. $y^{max}$ is a maximum of values of the to-be-encoded points in the target point cloud group in the y-direction. $z^{max}$ is a maximum of values of the to-be-encoded points in the target point cloud group in the z-direction. Formulas for calculating $x^{max}$, $y^{max}$, and $z^{max}$ are as follows, respectively:

$$x^{max} = \max(x^0, x^1, \ldots, x^{k-1});$$
$$y^{max} = \max(y^0, y^1, \ldots, y^{k-1});\ z^{max} = \max(z^0, z^1, \ldots, z^{k-1})$$

In the preceding formulas, $\max(s^0, s^1, \ldots, s^{sk-1})$ is a function for finding a maximum value, and means finding a maximum value from current inputs.

In conclusion, the point cloud bounding box of the target point cloud group may be obtained based on the origin of the point cloud bounding box and the dimensions of the point cloud bounding box in the x-direction, the y-direction, and the z-direction that are obtained through calculation. A bounding box may approximate a complex geometric object by a geometric object with a slightly larger volume and fewer characteristics (referred to as a bounding box). In some embodiments, the point cloud bounding box of the target point cloud group is a smallest cuboid that may be configured to encompass all the to-be-encoded points in the target point cloud group. For examples of a bounding box that encompasses a geometric object, refer to FIG. 9. Three-dimensional space areas occupied by the bounding boxes encompass complete geometric objects. In a first diagram shown in FIG. 9, the geometric object encompassed by the point cloud bounding box is an object holding a basketball in hands. In a second diagram shown in FIG. 9, the geometric object encompassed by the point cloud bounding box is a rabbit.

Figure 9:
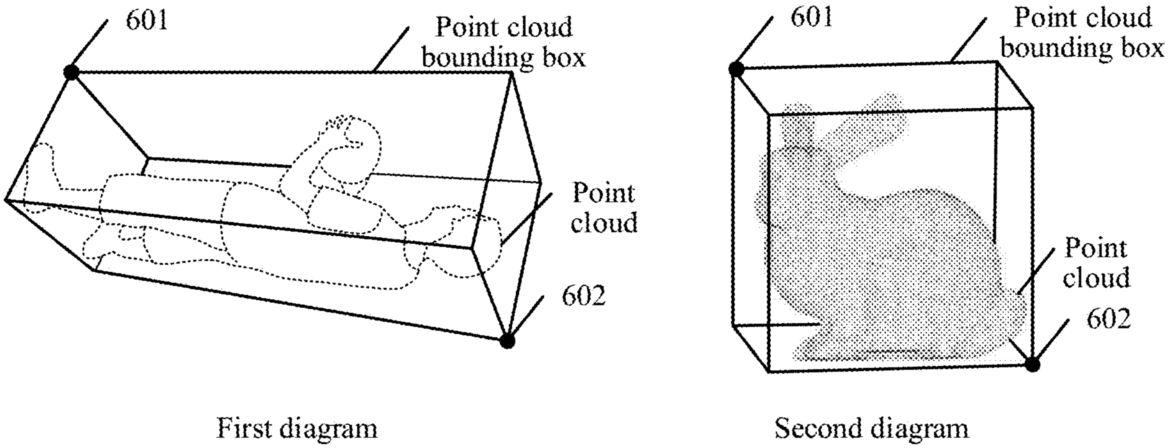
FIG. 9 is a diagram of a point cloud bounding box according to some embodiments.

12: Select P1 starting points from a plurality of vertices of the point cloud bounding box of the target point cloud group according to a selection rule, P1 being greater than or equal to 1. The selection rule may include but is not limited to performing selection randomly, performing selection based on geometric distance relationships between vertices, and performing selection in a preset direction. The performing selection randomly means randomly selecting P1 vertices from a plurality of vertices as starting points. The performing selection based on geometric distance relationships between vertices means using P1 vertices with a longest geometric distance in between as starting points based on geometric distance relationships between vertices. The performing selection in a preset direction means selecting P1 starting points in the x-direction, the y-direction, and/or the z-direction. With reference to FIG. 9, each point cloud bounding box is a cuboid, and each cuboid has eight vertices. Based on a requirement that vertices with a longest geometric distance in between are selected, a vertex 601 and a vertex 602 may be selected as needed from the eight vertices as starting points of a target point cloud group. The selected vertex 601 and vertex 602 may not be to-be-encoded points in the target point cloud group, for example, the vertex 601 and the vertex 602 may be points that do not belong to the target point cloud group.

Figure 10:
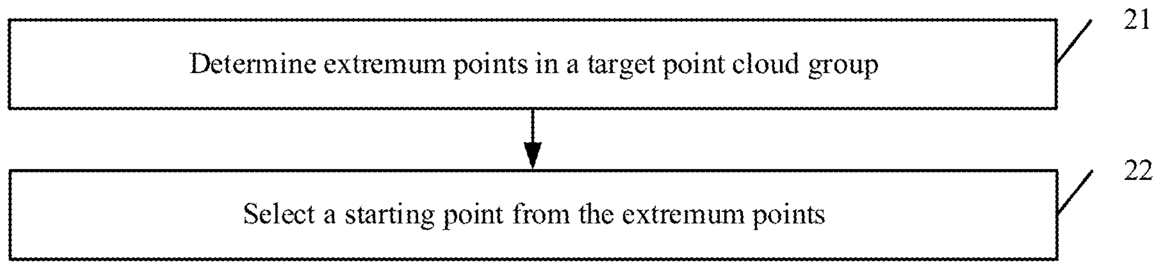
FIG. 10 is a diagram of selecting a starting point from a plurality of extremum points in a point cloud group according to some embodiments.

Selecting a starting point from a plurality of first identified points in a point cloud group. It is assumed that any one of the L point cloud groups is a target point cloud group. As shown in FIG. 10, an implementation process of selecting a starting point for the target point cloud group may include operations 21 and 22.

21: Determine first identified points in the target point cloud group. The first identified points may be a plurality of points that are in the target point cloud group and whose geometric distances are greater than a distance threshold. For example, first identified points include extremum points and median points. Extremum points include maximum points and minimum points in various directions (for example, an x-direction, a y-direction, and a z-direction). A median point may include a point in a middle position among a plurality of points that are arranged in order in a target point cloud group. For example, coordinate information of the to-be-encoded points in the target point cloud group in the x-direction, the y-direction, and the z-direction may be obtained. The coordinate information of the to-be-encoded points in each direction may be compared to determine extremum points in the plurality of to-be-encoded points in each direction. For example, a minimum point in a plurality of to-be-encoded points in an x-direction is selected as a first identified point. A value of the minimum point in the x-direction may be a minimum, but values in the y-direction and the z-direction may not necessarily be minimums. The minimum point ($x^{min}$, $y^{min}$, $z^{min}$) with a minimum value in each of the x-direction, the y-direction, and the z-direction described above may be selected as a first identified point; and the maximum point ($x^{max}$, $y^{max}$, $z^{max}$) with a maximum value in each of the x-direction, the y-direction, and the z-direction described above may be selected as a first identified point.

22: Select P2 starting points from the maximum points, the minimum points, and the median points, P2 being greater than or equal to 1. For example, a minimum point may be selected from the maximum points and the minimum points as a starting point of the target point cloud group, or both a maximum point and a minimum point are selected as starting points of the target point cloud group, or the like. The maximum points and the minimum points that arc determined based on real geometry information of the to-be-encoded points in the target point cloud group may be to-be-encoded points included in the target point cloud group, or may be points that do not belong to the target point cloud group.

Figure 11:
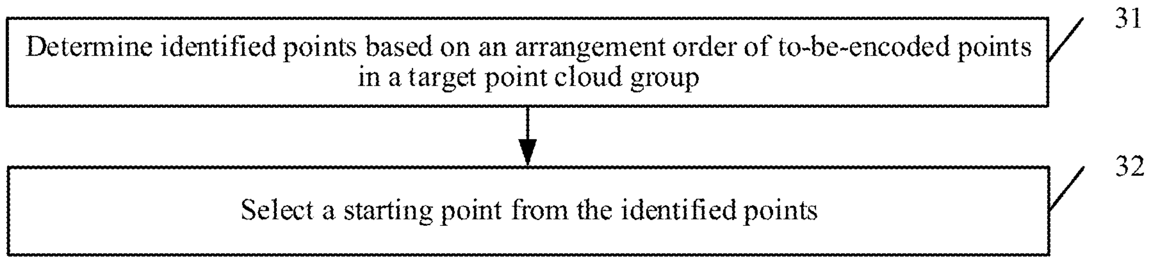
FIG. 11 is a diagram of selecting a starting point based on an arrangement order of to-be-encoded points in a point cloud group according to some embodiments.

Selecting a starting point based on an arrangement order of to-be-encoded points in a point cloud group. As described above, the point cloud groups are obtained through division that is performed based on the arrangement order of the to-be-encoded points in the point cloud sequence. A plurality of to-be-encoded points included in a point cloud group are also arranged in order. It is assumed that any one of the L point cloud groups is a target point cloud group. As shown in FIG. 11, an implementation process of selecting a starting point for the target point cloud group may include operations 31 and 32.

31: Determine one or more second identified points based on an arrangement order of to-be-encoded points in the target point cloud group, the second identified point including at least one of a head point in the arrangement order and a tail point in the arrangement order. The second identified point in the target point cloud group may be a middle point that helps to increase encoding efficiency. A type of the second identified point is not limited, provided that a starting point that helps to increase encoding efficiency is selected.

32: Select P3 starting points from the one or more second identified points, P3 being greater than or equal to 1. For example, it is assumed that to-be-encoded points included in a target point cloud group are arranged in the following order: a point 1→a point 2→a point 3→ . . . →a point 10. A starting point in the arrangement order, for example, a head to-be-encoded point in the arrangement order, may be determined as the point 1; and an ending point in the arrangement order, for example, a tail to-be-encoded point in the arrangement order, may be determined as the point 10. The point 1 that is the starting point in the arrangement order in the target point cloud group may be selected as a starting point of the target point cloud group, or the point 10 that is the ending point in the arrangement order in the target point cloud group may be selected as a starting point of the target point cloud group.

Based on the foregoing description, the following points (1) to (5) are explained.

(1) Selecting a starting point is not limited to only one of the foregoing implementations in some embodiments. For example, a starting point may be selected from a plurality of vertices of a point cloud bounding box of a target point cloud group, and/or a starting point may be selected from extremum points in a target point cloud group, and/or a starting point may be selected based on an arrangement order of a plurality of to-be-encoded points in a target point cloud group. For example, a lower-left vertex of a point cloud bounding box that is of a target point cloud group and that is obtained through space partitioning (for example, a process of determining a point cloud bounding box of a point cloud group) is selected as a starting point. The starting point may not belong to the target point cloud group. An ending point in an arrangement order of a plurality of to-be-encoded points may be selected as a starting point. The starting point may belong to the target point cloud group. A starting point selected for a target point cloud group may be a to-be-encoded point that belongs to the target point cloud group, or may be a point that does not belong to the target point cloud group.

(2) Selecting a starting point based on a geometric positional relationship is also supported in some embodiments. For example, a first starting point may be determined for the target point cloud group first. The first starting point may be determined in any one of the three starting point selection manners mentioned above. For example, a first starting point may be determined based on a plurality of vertices of a point cloud bounding box of a target point cloud group, or determined from a plurality of extremum points in a target point cloud group, or determined based on an arrangement order of to-be-encoded points in a target point cloud group. A starting point is selected from points in the target point cloud group based on a geometric positional relationship between the first starting point and each point in the target point cloud group. The geometric positional relationship herein may be a geometric distance relationship between a starting point and each point. If a geometric distance between a starting point and any point is longer than geometric distances between the starting point and other points, a geometric distance relationship between the starting point and the any point is as follows: The any point is a point farthest from the any starting point.

For example, based on a first starting point of a target point cloud group being determined, a geometric distance between the first starting point and each point in the target point cloud group may be determined. Based on the geometric distances, a point with a longest geometric distance from the first starting point is selected from the points in the target point cloud group, as a second starting point. Further, if a third starting point needs to be selected, a point with longer geometric distances from both the first starting point and the second starting point may be selected from points remaining in the target point cloud group, as the third starting point. Similar operations may be performed until P4 starting points are selected, where P4 is greater than or equal to 1.

(3) The following is also supported in some embodiments: Selecting starting points for some of the L point cloud groups based on the foregoing several implementations (for example, based on a point cloud bounding box, from a plurality of first identified points in a point cloud group, based on an arrangement order in a point cloud group, or based on a positional relationship between a starting point and each point in a point cloud group). Based on the point cloud groups for which the starting points are selected, a starting point is determined for a point cloud group that is of the L point cloud groups and for which no starting point is selected. For example, the L point cloud groups include an $m^{th}$ point cloud group and an $(m+1)^{th}$ point cloud group. One or more starting points may be selected for the $m^{th}$ point cloud group based on the foregoing several implementations. If one or more starting points are already selected for the $m^{th}$ point cloud group, a starting point may be selected from the one or more starting points of the $m^{th}$ point cloud group according to a screening rule for the $(m+1)^{th}$ point cloud group. The screening rule may include but is not limited to the following: performing selection randomly, or selecting a starting point with a lowest priority from the one or more starting points of the $m^{th}$ point cloud group. The starting point of the $(m+1)^{th}$ point cloud group may include a starting point that is determined based on the foregoing several implementations, in addition to the starting point of the $m^{th}$ point cloud group.

For example, if one or more starting points are already selected for the $m^{th}$ point cloud group, a single-chain predictive tree may be constructed for the $m^{th}$ point cloud group based on the one or more starting points. A tail point of the single-chain predictive tree of the $m^{th}$ point cloud group (for example, a starting point with a lowest priority among the one or more starting points of the $m^{th}$ point cloud group) may be used as a starting point of the $(m+1)^{th}$ point cloud group.

(4) When a starting point is actually selected for a target point cloud group, a starting point that helps to increase encoding efficiency may be selected. For example, if encoding efficiency corresponding to a case in which a lower-left vertex of a point cloud bounding box of a target point cloud group is selected as a starting point and a predictive tree is constructed based on the lower-left vertex is higher than encoding efficiency corresponding to a case in which a lower-right vertex of the point cloud bounding box of the target point cloud group is selected as a starting point and a predictive tree is constructed based on the lower-right vertex, the lower-left vertex of the point cloud bounding box may be selected as a starting point of the target point cloud group.

(5) Based on a starting point being selected, a priority may further be set for the starting point. For example, the same priority or different priorities are set for a plurality of starting points. For example, in descending order of priorities, starting points may be referred to as a first starting point, a second starting point, a third starting point, and the like, respectively. By setting priorities for starting points, the following order may be defined in advance: an order in which points are selected based on the starting points when a predictive tree is constructed for a target point cloud group based on the plurality of starting points. For example, a lower-left vertex of a point cloud bounding box that is of a target point cloud group and that is obtained through space partitioning is selected as a first starting point, and an ending point in an arrangement order of a plurality of to-be-encoded points is selected as a second starting point. Later, a point may be selected first based on the first starting point and connected to the first starting point, and a point may be selected based on the second starting point and connected to the second starting point.

403: Construct a single-chain predictive tree for each point cloud group based on the starting points of the point cloud group.

By dividing entire point cloud data, the entire point cloud data may be divided into a plurality of point cloud groups, so that single-chain predictive trees can be synchronously constructed for the point cloud groups in units of point cloud groups. Compared with constructing a predictive tree for entire point cloud data, this helps reduce time for constructing a predictive tree, increasing efficiency of constructing the predictive tree. The following describes, by using an example, an implementation process of constructing a single-chain predictive tree. In this example, any one of the L point cloud groups obtained by dividing the point cloud data is a target point cloud group, starting points of the target point cloud group include at least a first starting point and a second starting point, and a priority of the first starting point is higher than a priority of the second starting point.

First, the encoding device determines points other than the starting points in the target point cloud group as candidate points, and adds the candidate points to a set of alternative points. For example, to-be-encoded points in a target point cloud group include a point 1, a point 2, a point 3, a point 4, and a point 5. If starting points of the target point cloud group include a first starting point and a second starting point, the first starting point is a to-be-encoded point in the target point cloud group (for example, the point 1), and the second starting point is not a to-be-encoded point in the target point cloud group (for example, a point 6), the to-be-encoded points other than the first starting point (for example, the point 1) in the target point cloud group may be determined as candidate points and added to a set of alternative points. The set of alternative points may be [the point 2, the point 3, the point 4, the point 5]. The encoding device constructs the single-chain predictive tree for the target point cloud group based on the set of alternative points, the first starting point, and the second starting point. A starting point of the single-chain predictive tree is the first starting point, and an ending point is the second starting point.

The following describes an implementation process of constructing the single-chain predictive tree based on the set of alternative points, the first starting point, and the second starting point.

In some embodiments, search may be performed in order of the priorities of the plurality of starting points of the target point cloud group, to construct a branch chain on which each starting point resides. For example, the following may be included: constructing a first branch chain of the single-chain predictive tree of the target point cloud group based on the first starting point and the set of alternative points, and constructing a second branch chain of the single-chain predictive tree of the target point cloud group based on the second starting point and the set of alternative points; and connecting the first branch chain and the second branch chain, to obtain the single-chain predictive tree of the target point cloud group, which may include: connecting a tail point on the first branch chain with a higher priority to a tail point on the second branch chain with a lower priority, to obtain the single-chain predictive tree of the target point cloud group.

In some embodiments, (1) and (2) are included.

(1) Search, with the first starting point with a higher priority as a search starting point, the set of alternative points for a first candidate point that is at a shortest geometric distance from the first starting point, connect the first candidate point to the first branch chain that uses the first starting point as a head point, and update the set of alternative points based on the first candidate point, where the updating is to delete the first candidate point from the set of alternative points to obtain the updated set of alternative points; search, with the second starting point with a lower priority as a search starting point, the updated set of alternative points for a second candidate point that is at a shortest geometric distance from the second starting point, connect the second candidate point to the second branch chain that uses the second starting point as a head point, and update the updated set of alternative points based on the second candidate point, where the updating is to delete the second candidate point from the updated set of alternative points to obtain the set of alternative points that is updated again; and repeat the foregoing operations until the set of alternative points is an empty set, to obtain the first branch chain and the second branch chain of the single-chain predictive tree of the target point cloud group.

Figure 12:
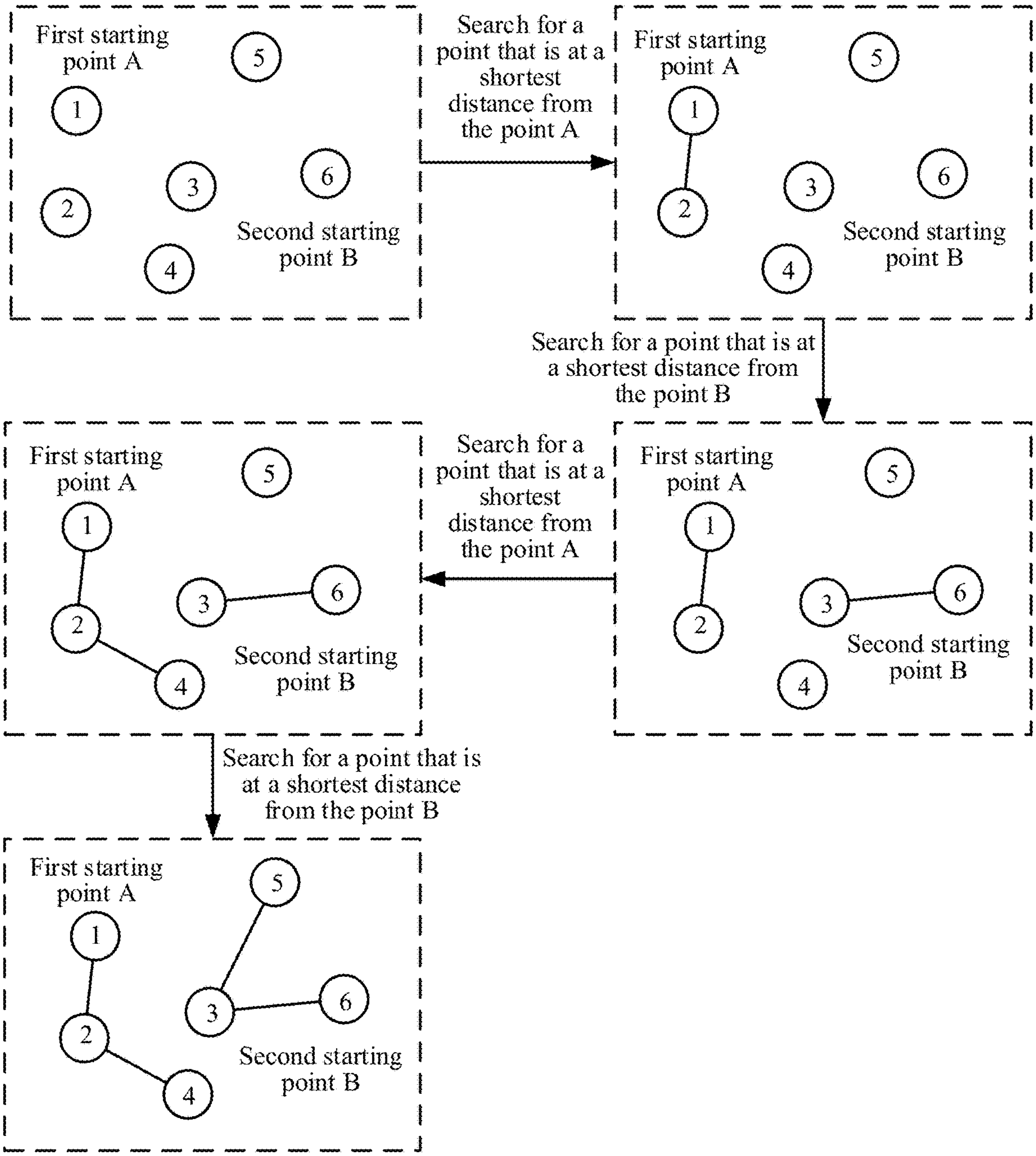
FIG. 12 is a diagram of connecting a first branch chain and a second branch chain according to some embodiments.

For example, as shown in FIG. 12, it is assumed that to-be-encoded points in a target point cloud group are a point 1, a point 2, a point 3, a point 4, and a point 5. Starting points of the target point cloud group include a first starting point A, which is the point 1, and a second starting point B, which is a point 6 that does not belong to the target point cloud group. The to-be-encoded points other than the point 1 in the target point cloud group are determined as candidate points and added to a set of alternative points. The set of alternative points may include the point 2, the point 3, the point 4, and the point 5. In order of priorities of the starting points, the set of alternative points may be searched, first with the first starting point A as a search starting point, for a first candidate point (for example, the point 2) that is at a shortest geometric distance from the first starting point A. The point 2 may be connected to the first starting point A to construct a first branch chain, and the first candidate point may be deleted from the set of alternative points. The set of alternative points from which the first candidate point is deleted may be searched, with the second starting point B as a search starting point, for a second candidate point (for example, the point 3) that is at a shortest geometric distance from the second starting point B. The second candidate point is connected to the second starting point B to construct a second branch chain, and the second candidate point is also deleted from the set of alternative points from which the first candidate point is deleted. The updated set of alternative points may include the point 4 and the point 5.

Further, the updated set of alternative points is searched, with the first starting point A as a search starting point again, for a third candidate point (for example, the point 4) that is at a shortest geometric distance from the first starting point A. The third candidate point is connected to a current tail point on the first branch chain (for example, the first candidate point) to construct the first branch chain, and the third candidate point is deleted from the updated set of alternative points. Likewise, the updated set of alternative points is searched, with the second starting point B as a search starting point again, for a fourth candidate point (for example, the point 5) that is at a shortest geometric distance from the second starting point B. Because only the point 5 is left in the set of alternative points now, the point 5 may be directly used as the fourth candidate point and connected to a current tail point on the second branch chain (for example, the second candidate point), to construct the second branch chain. The fourth candidate point is deleted from the updated set of alternative points. At this time, the set of alternative points is an empty set. The first branch chain that is constructed with the first starting point A as a search starting point is the point 1→the point 2→the point 4, and the second branch chain that is constructed with the second starting point B as a search starting point is the point 6→the point 3→the point 5.

Figure 13:
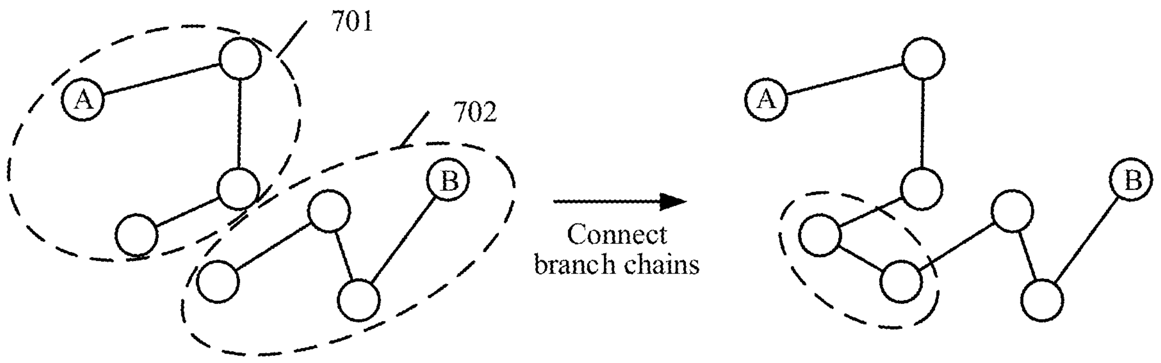
FIG. 13 is a diagram of constructing branch chains in order of priorities of starting points according to some embodiments.

(2) Connect the first branch chain of the single-chain predictive tree and the second branch chain of the single-chain predictive tree to construct the single-chain predictive tree of the target point cloud group. For a diagram of the connection process, refer to FIG. 13. It is assumed that starting points of a target point cloud group include a starting point A (for example, a first starting point) and a starting point B (for example, a second starting point). First, a set of alternative points is created for the target point cloud group. The set of alternative points does not include the starting points of the target point cloud group. With the starting point A as a search starting point, unconnected to-be-encoded points in the set of alternative points are searched one by one for a point that is at a shortest geometric distance from the starting point A, and the found point is used as a succeeding node of a current point (for example, a point to be connected to a next point on a first branch chain), to obtain the first branch chain 701 with the starting point A as a search starting point. Likewise, with the starting point B as a search starting point, unconnected to-be-encoded points in the set of alternative points are searched one by one for a point that is at a shortest geometric distance from the starting point B, and the found point is used as a succeeding node of a current point, to obtain a second branch chain 702 with the starting point B as a search starting point. A tail point on the first branch chain 701 is connected to a tail point on the second branch chain 702. A predictive tree obtained through the connection is used as a single-chain predictive tree of the target point cloud group. The starting point A (for example, the first starting point) is used as a starting point of the single-chain predictive tree of the target point cloud group, and the starting point B (for example, the second starting point) is used as an ending point of the single-chain predictive tree of the target point cloud group.

It may be assumed that a current to-be-encoded point in the target point cloud group is i, the first starting point is denoted as A, and the second starting point is denoted as B. A distance between the current point i and the first starting point A may be a weighted sum of a distance between the current point i and the first starting point A and a distance between the current point i and the second starting point B: $d1=a1\times d(i, A)+b1\times d(i, B)$, where $a1>0, b1<0$. The weighted sum indicates selecting a point that is closest to the first starting point A and that is farthest from the second starting point B from the set of alternative points, as a succeeding node of the first starting point A. Likewise, a distance between the current point i and the second starting point B is a weighted sum of a distance between the current point i and the first starting point A and a distance between the current point i and the second starting point B: $d2=a2\times d(i, A)+b2\times d(i, B)$, where $a2<0, b2>0$. The weighted sum indicates selecting a point that is closest to the second starting point B and that is farthest from the first starting point A from the set of alternative points, as a succeeding node of the second starting point B. A procedure of this implementation may include the following:

First, a first weighted sum of a distance between each candidate point in the set of alternative points and the first starting point and a distance between the candidate point and the second starting point is calculated according to a first calculation rule. The first calculation rule may be $d1=a1\times d(i, A)+b1\times d(i, B)$.

In the preceding calculation rule, i is a candidate point in the set of alternative points, A is the first starting point of the target point cloud group, B is the second starting point of the target point cloud group, d(i, A) is a geometric distance between the candidate point i and the first starting point A, and d(i, B) is a geometric distance between the candidate point i and the second starting point B. A value of a coefficient a1 is $a1>0$, and a value of a coefficient b1 is $b1<0$. For example, a larger value of d1 indicates that the candidate point i is closer to the first starting point A and farther from the second starting point B. It is determined that an association between the candidate point i and the first starting point A is stronger than an association between the candidate point i and the second starting point B. Values of the coefficients a1 and b1 are not limited.

A first candidate point, whose first weighted sum of distances indicates a shortest distance from the first starting point and a longest distance from the second starting point, is added to the first branch chain that uses the first starting point as a head point, for example, the first candidate point is selected as a succeeding node (for example, a point on the first branch chain) of the first starting point. The set of alternative points is updated based on the first candidate point. The updating is to delete the first candidate point from the set of alternative points to obtain the updated set of alternative points.

Likewise, a second weighted sum of a distance between each candidate point in the updated set of alternative points and the first starting point and a distance between the candidate point and the second starting point is calculated according to a second calculation rule. The second calculation rule may be:

$$d2 = a2 \times d(i, A) + b2 \times d(i, B)$$

In the preceding calculation rule, i is a candidate point in the set of alternative points, A is the first starting point of the target point cloud group, B is the second starting point of the target point cloud group, d(i, A) is a geometric distance between the candidate point i and the first starting point A, and d(i, B) is a geometric distance between the candidate point i and the second starting point B. A value of a coefficient a2 is $a2<0$, and a value of a coefficient b2 is $b2>0$. For example, a larger value of d2 indicates that the candidate point i is farther from the first starting point A and closer to the second starting point B. It is determined that an association between the candidate point i and the second starting point B is stronger than an association between the candidate point i and the first starting point A. Values of the coefficients a2 and b2 are not limited.

A second candidate point, whose second weighted sum of distances indicates a longest distance from the first starting point and a shortest distance from the second starting point, is added to the second branch chain that uses the second starting point as a head point, for example, the second candidate point is selected as a succeeding node (for example, a point on the second branch chain) of the second starting point. The updated set of alternative points is updated based on the second candidate point. The updating is to delete the second candidate point from the set of alternative points from which the first candidate point is deleted, to obtain the set of alternative points that is updated for a second time.

Finally, the foregoing operations are repeated until the set of alternative points is an empty set, to connect all points in the target point cloud group to the branch chains and to obtain the first branch chain and the second branch chain of the single-chain predictive tree of the target point cloud group.

Figure 14:
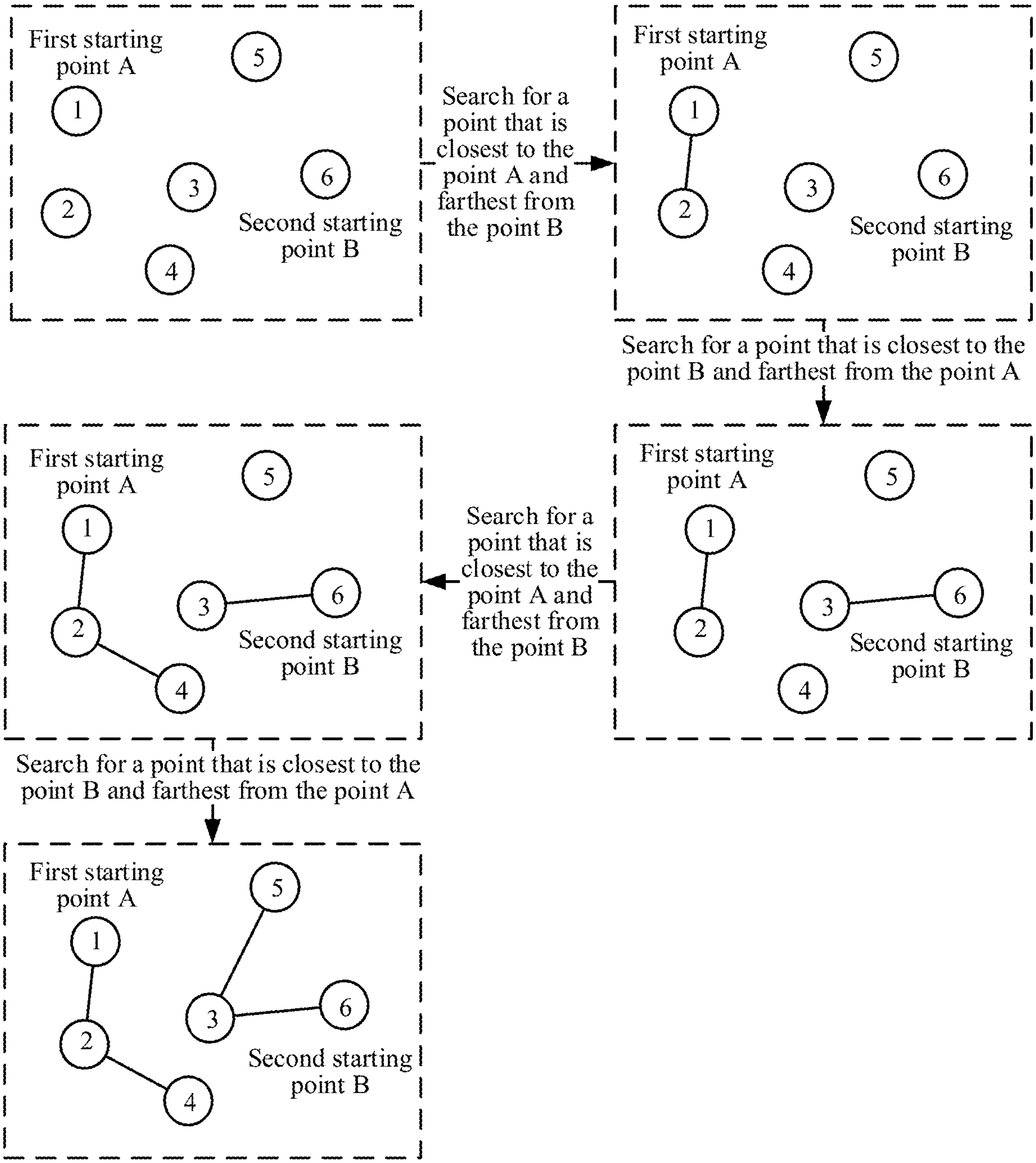
FIG. 14 is a diagram of performing a plurality of searches with a plurality of starting points as references to construct branch chains according to some embodiments.

For example, as shown in FIG. 14, it is assumed that to-be-encoded points in a target point cloud group are a point 1, a point 2, a point 3, a point 4, and a point 5. Starting points of the target point cloud group include a first starting point A, which is the point 1, and a second starting point B, which is a point 6 that does not belong to the target point cloud group. The to-be-encoded points other than the point 1 in the target point cloud group are determined as candidate points and added to a set of alternative points. The set of alternative points may include the point 2, the point 3, the point 4, and the point 5. A first weighted sum of a distance between each candidate point in the set of alternative points and the first starting point A and a distance between the candidate point and the second starting point B is calculated according to a first calculation rule. A first candidate point, whose first weighted sum of distances indicates a shortest distance from the first starting point A and a longest distance from the second starting point B, is selected as a succeeding node of the first starting point A. For example, a first weighted sum of distances corresponding to the point 2 is 3, a first weighted sum of distances corresponding to the point 3 is 7, a first weighted sum of distances corresponding to the point 4 is 5, and a first weighted sum of distances corresponding to the point 5 is 10. The point 5 may be selected as a succeeding node of the first starting point A. The first candidate point may be deleted from the set of alternative points to update the set of alternative points.

A second weighted sum of a distance between each candidate point in the updated set of alternative points and the first starting point A and a distance between the candidate point and the second starting point B may be calculated according to a second calculation rule. A second candidate point, whose second weighted sum of distances indicates a longest distance from the first starting point A and a shortest distance from the second starting point B, is selected as a succeeding node of the second starting point B. For example, a second weighted sum of distances corresponding to the point 2 is 7, a second weighted sum of distances corresponding to the point 3 is 5, and a second weighted sum of distances corresponding to the point 4 is 6. The point 2 may be selected as a succeeding node of the second starting point B. The second candidate point may be deleted from the updated set of alternative points to update the set of alternative points. The foregoing operations are repeated until the set of alternative points is an empty set, to obtain a first branch chain that uses the first starting point A as a head point and a second branch chain that uses the second starting point B as a head point.

A plurality of searches may be performed, with the plurality of starting points of the target point cloud group as references, to directly construct the single-chain predictive tree for the target point cloud group.

Performing a plurality of searches with the plurality of starting points of the target point cloud group as references may be briefly described as follows: It is assumed that a current to-be-encoded point in the target point cloud group is i, the first starting point is denoted as A, and the second starting point is denoted as B. A distance between the current point i and the first starting point A may be a weighted sum of a distance between the current point i and the first starting point A and a distance between the current point i and the second starting point B: $d1=a1\times d(i, A)+b1\times d(i, B)$, where $a1>0, b1<0$. The weighted sum indicates selecting a point that is closest to the first starting point A and that is farthest from the second starting point B from the set of alternative points, as a succeeding node of the first starting point A. A weighted sum of distances of any candidate point is a difference between a first weighted value of a distance between the any candidate point and the first starting point and a second weighted value of a distance between the any candidate point and the second starting point. A weighted sum of a distance between each remaining point in the set of alternative points and the first starting point and a distance between the remaining point and the second starting point is calculated. A point, whose weighted sum of distances indicates a shortest distance from the first starting point and a longest distance from the second starting point, is connected to a tail point of the single-chain predictive tree. The foregoing operations are repeated until the set of alternative points is an empty set, to obtain the single-chain predictive tree of the target point cloud group.

A procedure of this implementation may include the following: First, a weighted sum of a distance between each candidate point in the set of alternative points and the first starting point and a distance between the candidate point and the second starting point is determined according to a distance calculation rule. The distance calculation rule is $d1=a1\times d(i, A)+b1\times d(i, B)$, where $a1>0, b1<0$. A weighted sum of distances of a point calculated according to the distance calculation rule may be used to indicate selecting a point that is closest to the first starting point A and that is farthest from the second starting point B from the set of alternative points.

In ascending order of the weighted sums of distances, the candidate points in the set of alternative points are connected in sequence, to obtain a candidate point chain. A head point on the candidate point chain is a first candidate point with a smallest weighted sum of distances, and a tail point on the candidate point chain is a second candidate point with a largest weighted sum of distances. Finally, the first candidate point on the candidate point chain is connected to the first starting point, and the second candidate point on the candidate point chain is connected to the second starting point, to obtain the single-chain predictive tree of the target point cloud group.

The following implementation is also supported in some embodiments: Based on obtaining the weighted sums of distances of the points in the set of alternative points, first selecting a first point with a smallest weighted sum of distances and connecting the first point to the first starting point; selecting a second point with a smallest weighted sum of distances from remaining points and connecting the second point to the first point; selecting a point with a smallest weighted sum of distances from remaining points and connecting the point to the second point; and repeating the foregoing operations until all the points in the set of alternative points are connected, to obtain the single-chain predictive tree of the target point cloud group. A process of directly constructing the single-chain predictive tree for the target point cloud group with the plurality of starting points of the target point cloud group as references is not limited.

Performing a plurality of searches with the plurality of starting points of the target point cloud group as references may be briefly described as follows: It is assumed that a current to-be-encoded point in the target point cloud group is i, the first starting point is denoted as A, and the second starting point is denoted as B. A distance between the current point i and the first starting point A may be a weighted sum of a distance between the current point i and the first starting point A and a distance between the current point i and the second starting point B: $d1=a1\times d(i, A)+b1\times d(i, B)$, where $a1>0, b1<0$. The weighted sum indicates selecting a point that is closest to the first starting point A and that is farthest from the second starting point B from the set of alternative points, as a succeeding node of the first starting point A. A weighted sum of a distance between each remaining point in the set of alternative points and the first candidate point and a distance between the remaining point and the second starting point is calculated. A second candidate point, whose weighted sum of distances indicates a shortest distance from the first candidate point and a longest distance from the second starting point, is connected to the first candidate point. The single-chain predictive tree may be constructed for the target point cloud group.

A procedure of this implementation may include the following:

First, with the first starting point as a search starting point, the set of alternative points is searched for the first candidate point that has a smallest weighted sum of a distance between the first candidate point and the search starting point and a distance between the first candidate point and the second starting point. A weighted sum of distances of any candidate point is a difference between a first weighted value of a distance between the any candidate point and the first starting point and a second weighted value of a distance between the any candidate point and the second starting point. A rule for calculating a weighted sum of distances is $d1=a1\times d(i, A)+b1\times d(i, B)$, where $a1>0, b1<0$. The first candidate point is connected to the search starting point (for example, the first starting point). The set of alternative points is updated based on the first candidate point. For example, the first candidate point is deleted from the set of alternative points.

With the first candidate point as a new search starting point, the updated set of alternative points is searched for the second candidate point that has a smallest weighted sum of a distance between the second candidate point and the search starting point and a distance between the second candidate point and the second starting point. The second candidate point is connected to the new search starting point, and the set of alternative points is updated based on the second candidate point. With the second candidate point as a new search starting point, searching for a candidate point continues until the set of alternative points is an empty set.

Finally, the last found candidate point is connected to the second starting point, to obtain the single-chain predictive tree of the target point cloud group.

The foregoing includes examples of constructing the branch chains provided in some embodiments. Such may facilitate finding an unordered point that is in the target point cloud group and that is at a shortest distance (for example, a geometric distance or a weighted sum of distances) from the first starting point, and finding an unordered point that is in the target point cloud group and that is at a shortest distance from the second starting point, to improve an association between adjacent unordered points in three-dimensional space. During actual application, other implementations may be used to achieve the foregoing purpose. An implementation process of constructing the branch chains is not limited.

404: Encode each to-be-encoded point in the point cloud data based on the single-chain predictive tree of each point cloud group.

Based on the single-chain predictive tree of each point cloud group in the point cloud data being obtained by performing the foregoing operations 401 to 403, the following is further supported in some embodiments: constructing a target predictive tree for the point cloud data based on the single-chain predictive tree of each point cloud group, to encode each to-be-encoded point in the point cloud data based on the target predictive tree of the point cloud data. For example, the single-chain predictive tree of each of the L point cloud groups may be obtained. In an obtaining order of the L point cloud groups, for example, an order in which the L point cloud groups are obtained by dividing the point cloud data, the single-chain predictive trees of the point cloud groups are connected in sequence, to obtain the target predictive tree of the point cloud data. A starting point of the target predictive tree is a first starting point of the first point cloud group of the L point cloud groups, and an ending point of the target predictive tree is an ending point of the $L^{th}$ point cloud group of the L point cloud groups. Finally, each to-be-encoded point in the point cloud data is encoded based on the target predictive tree.

Figure 15:
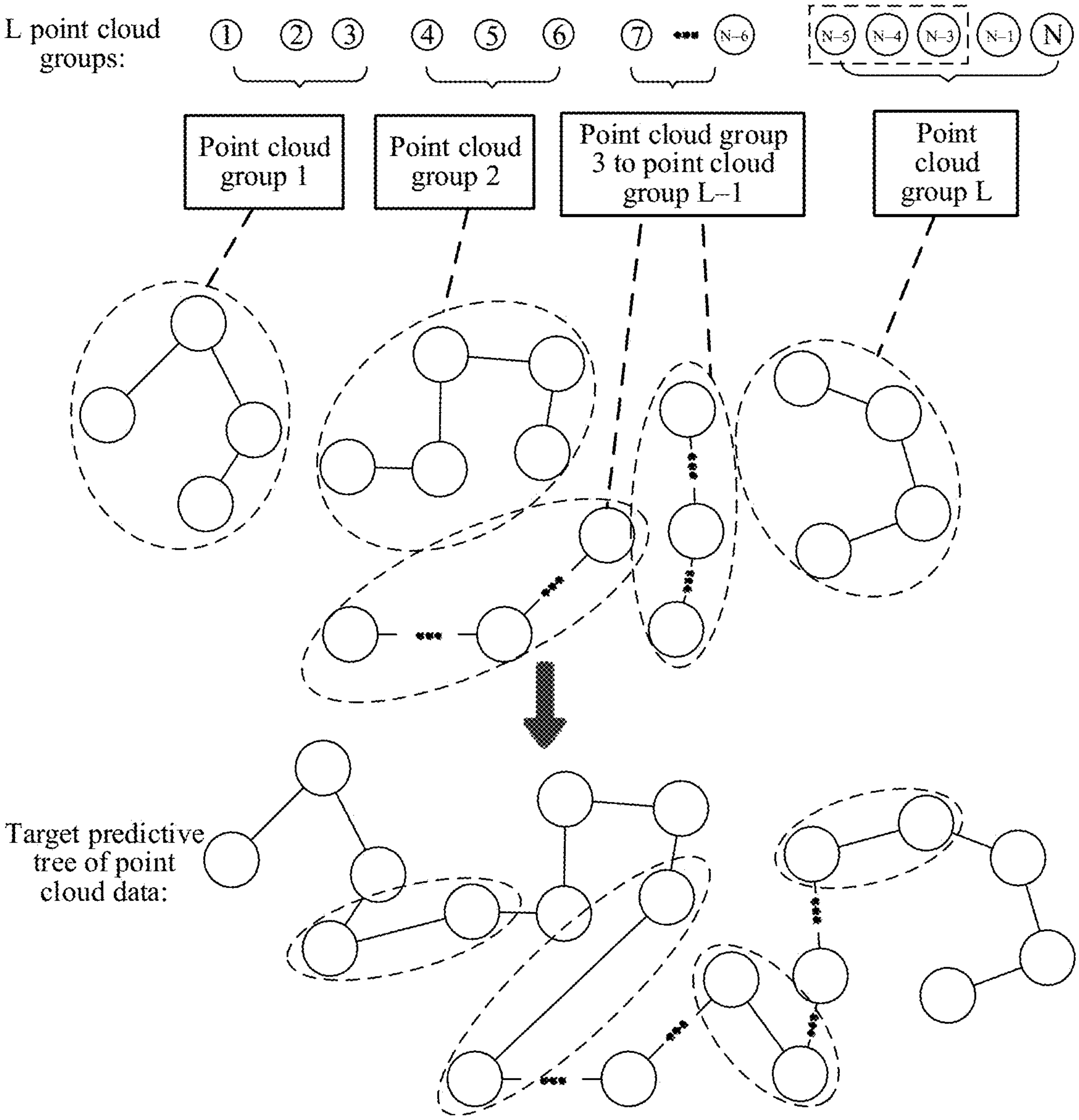
FIG. 15 is a diagram of constructing a target predictive tree for entire point cloud data based on single-chain predictive trees of L point cloud groups according to some embodiments.

For a diagram of an example process of constructing a target predictive tree for entire point cloud data based on single-chain predictive trees of L point cloud groups, refer to FIG. 15. As shown in FIG. 15, point cloud data includes L point cloud groups, and each point cloud group corresponds to a single-chain predictive tree. The single-chain predictive trees corresponding to the point cloud groups are connected in an order in which the L point cloud groups are obtained through division, to obtain a target predictive tree of the point cloud data. For example, L point cloud groups include a $j^{th}$ point cloud group and a $(j+1)^{th}$ point cloud group that are adjacent to each other, where $j=1, 2, \ldots, L-1$. A tail point (or referred to as an ending point) of a single-chain predictive tree of the $j^{th}$ point cloud group may be used as a head point (or referred to as a starting point) of a single-chain predictive tree of the $(j+1)^{th}$ point cloud group, to obtain a target predictive tree of point cloud data.

In some embodiments, based on the to-be-encoded point cloud data being obtained, the point cloud data may first be divided into the plurality of point cloud groups, a single-chain predictive tree is constructed for each point cloud group in units of groups, and finally the predictive tree of the entire point cloud data is obtained based on the single-chain predictive tree of each point cloud group. Compared with constructing a predictive tree for the entire point cloud data, this can help reduce time for constructing the predictive tree for the point cloud data, increasing efficiency of constructing the predictive tree. In addition, when a single-chain predictive tree is constructed for each point cloud group, two or more starting points may be determined for each point cloud group, and the single-chain predictive tree is constructed for the point cloud group based on the two or more starting points. In the manner of constructing a single-chain predictive tree based on a plurality of starting points, an efficient predictive tree structure can be implemented, associations between adjacent unordered points in the three-dimensional space can be improved, and efficiency of encoding the point cloud data can be increased.

Figure 16:
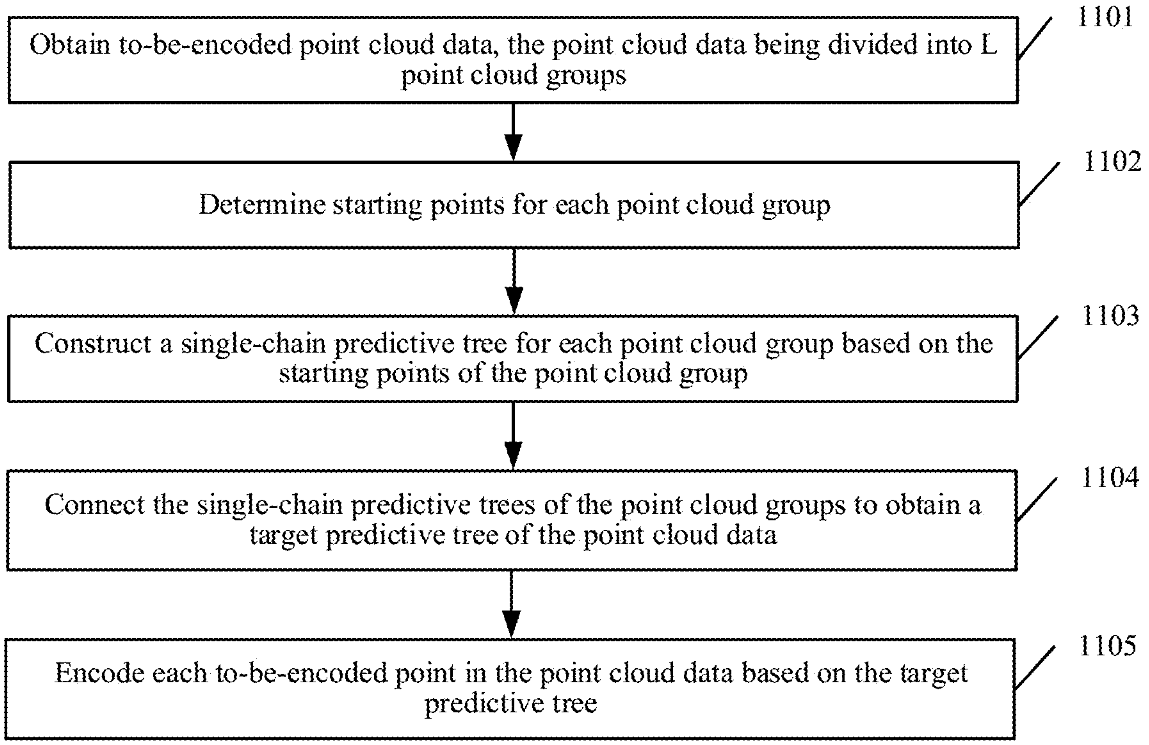
FIG. 16 is a schematic flowchart of a point cloud encoding method according to some embodiments.

Some embodiments provide a point cloud encoding method. For a point cloud encoding method, refer to FIG. 16. The point cloud encoding method may be performed by the encoding device 301 in the point cloud encoding and decoding system 30 shown in FIG. 5. As shown in FIG. 16, the point cloud encoding method may include the following operations 1101 to 1105:

1101: Obtain to-be-encoded point cloud data, the point cloud data being divided into L point cloud groups.

1102: Determine starting points for each point cloud group, a quantity of the starting points of each point cloud group being greater than 1.

1103: Construct a single-chain predictive tree for each point cloud group based on the starting points of the point cloud group.

1104: Connect the single-chain predictive trees of the point cloud groups to obtain a target predictive tree of the point cloud data.

For a implementation of operations 1101 to 1104, reference may be made to the description of operations 401 to 404 in some embodiments as shown in FIG. 6, for example.

1105: Encode each to-be-encoded point in the point cloud data based on the target predictive tree.

In some embodiments, an encoding device may encode each to-be-encoded point in the point cloud data by following a plurality of encoding rules, to obtain encoded point cloud data. The encoded point cloud data is an encoded bit stream, which is described herein. For example, bounding box information of a point cloud bounding box of point cloud data may be encoded to obtain encoded point cloud data. Starting point information of a first starting point (for example, real geometry information of a first starting point) of the first point cloud group of point cloud data may be encoded to obtain encoded point cloud data. Starting point information of starting points of each point cloud group of point cloud data may be encoded to obtain encoded point cloud data. In consideration that the target predictive tree is obtained by connecting the single-chain predictive trees of the L point cloud groups in sequence, a starting point of a point cloud group herein may be an ending point (or referred to as a tail point) of a single-chain predictive tree of a point cloud group that precedes and is adjacent to the point cloud group. For example, a starting point of a $j^{th}$ point cloud group may be an ending point of a single-chain predictive tree of a $(j-1)^{th}$ point cloud group.

The following describes the plurality of encoding rules. Refer to the following encoding rule 1 to encoding rule 3.

Encoding rule 1: An encoding device may encode bounding box information of a point cloud bounding box that is obtained through space partitioning and that is of entire point cloud data, and encode each to-be-encoded point in the point cloud data, to obtain an encoded bit stream. A decoding end may directly calculate, based on the point cloud bounding box of the point cloud data and space partitioning, starting point information (for example, reconstructed geometry information of starting points) of to-be-decoded point cloud data.

First, the bounding box information of the point cloud bounding box of the point cloud data is determined. The bounding box information may include but is not limited to origin information of the point cloud bounding box and dimensions of the point cloud bounding box in an x-direction, a y-direction, and a z-direction. The bounding box information is encoded to obtain encoded bounding box information. A geometry encoding scheme is determined for a target predictive tree. The geometry encoding scheme defines a method or policy for obtaining predicted geometry information of each to-be-encoded point in the point cloud data. Each to-be-encoded point in the point cloud data is encoded based on the geometry encoding scheme, to obtain encoded point cloud data. Finally, the encoded bit stream is obtained based on the encoded bounding box information and the encoded point cloud data.

In addition to encoding the bounding box information of the point cloud bounding box of the entire point cloud data, the following is also supported in some embodiments: encoding bounding box information of a point cloud bounding box of each point cloud group, and encoding each to-be-encoded point in the point cloud data, to obtain encoded point cloud data.

Encoding rule 2: An encoding end may encode starting point information (for example, real geometry information of a starting point) of the first point cloud group of point cloud data, and encode other to-be-encoded points in the point cloud data based on a geometry encoding scheme, to obtain an encoded bit stream. Starting point information of a starting point of a target predictive tree is encoded. The starting point of the target predictive tree herein may be a first starting point of the first point cloud group of L point cloud groups. Starting point information of the first starting point may be real geometry information of the first starting point in a three-dimensional spatial coordinate system. The encoding starting point information of a starting point of a target predictive tree described above includes: encoding the starting point information of the first starting point of the first point cloud group; determining a geometry encoding scheme for the target predictive tree, and encoding each to-be-encoded point in the point cloud data based on the geometry encoding scheme; and obtaining the encoded bit stream based on encoded starting point information of the starting point of the target predictive tree and encoded point cloud data.

Encoding rule 3: An encoding end may encode starting point information of a first starting point of a single-chain predictive tree of each point cloud group and group information of each point cloud group (for example, a quantity of points included in a point cloud group, and a group identifier (for example, a group number)), and encode other to-be-encoded points in point cloud data based on a geometry encoding scheme, to obtain encoded point cloud data. In consideration that an ending point of a single-chain predictive tree of a $j^{th}$ point cloud group is used as a first starting point of a single-chain predictive tree of a $(j+1)^{th}$ point cloud group, where $j=1, 2, \ldots, L-1$, in a process of connecting the single-chain predictive trees of the plurality of point cloud groups to obtain a target predictive tree of the point cloud data, a first starting point of a single-chain predictive tree mentioned above may be an ending point of a preceding adjacent single-chain predictive tree. For example, a first starting point of an $i^{th}$ group may be an ending point of an $(i-1)^{th}$ group. The encoding device encodes the starting point information of the first starting point of each single-chain predictive tree and the group information of each point cloud group; obtains the geometry encoding scheme for the target predictive tree, and encodes each to-be-encoded point in the point cloud data based on the geometry encoding scheme; and obtains an encoded bit stream based on encoded starting point information of the first starting point of the single-chain predictive tree of each point cloud group, encoded group information of each point cloud group, and the encoded point cloud data.

The foregoing descriptions provides three examples for encoding point cloud data. During actual application, other encoding implementations may also be available. This is not limited. The foregoing three encoding rules all may include a process of encoding each to-be-encoded point in point cloud data based on a geometry encoding scheme obtained for a target predictive tree. The process may be encoding prediction residual information of each to-be-encoded point in the point cloud data based on the geometry encoding scheme. An implementation process of encoding each to-be-encoded point in the point cloud data based on the geometry encoding scheme may include: first performing geometry prediction for each to-be-encoded point in the point cloud data based on the geometry encoding scheme obtained for the target predictive tree, to obtain predicted geometry information of each to-be-encoded point in the point cloud data; determining prediction residual information of each to-be-encoded point in the point cloud data based on the predicted geometry information and real geometry information of each to-be-encoded point in the point cloud data, which may be subtracting predicted geometry information of a to-be-encoded point from real geometry information of the to-be-encoded point to obtain prediction residual information of the to-be-encoded point; and finally encoding the prediction residual information of each to-be-encoded point in the point cloud data, to obtain an encoded bit stream.

Geometry encoding schemes (or referred to as prediction schemes) provided in some embodiments may include but are not limited to the following:

(1) Geometry prediction is not performed for a to-be-encoded point.

(2) Geometry prediction is performed for a current to-be-encoded point by using a single preceding node (parent point).

(3) Geometry prediction is performed for a current to-be-encoded point by using S preceding nodes (for example, a parent point and a grandparent point; or a parent point, a grandparent point, and a grand-grandparent point). It is assumed that in a single-chain predictive tree or a target predictive tree, there are Q points that precede a current to-be-encoded point. A value of S may be $2, 3, 4, \ldots, Q-1$.

The following describes implementation processes of the several example geometry encoding schemes mentioned above.

(1) For a first starting point in the first position in a target predictive tree, geometry prediction does not need to be performed for the first starting point.

Figure 17:
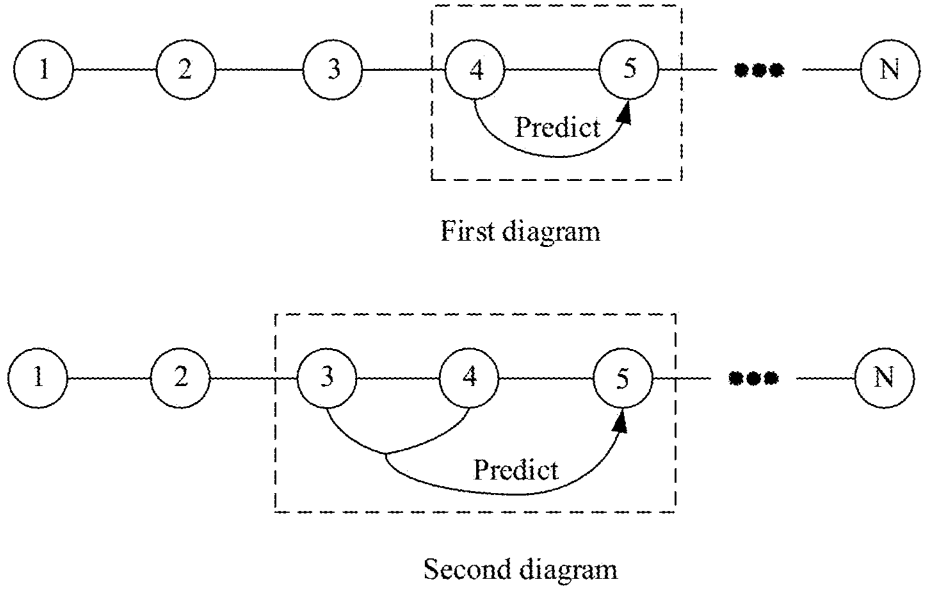
FIG. 17 is a diagram of obtaining predicted geometry information of a to-be-encoded point according to some embodiments.

(2) Geometry prediction is performed for a current to-be-encoded point by using a single preceding node. For example, predicted geometry information of the current to-be-encoded point may be determined based on a single preceding node (or referred to as a preceding point). It is assumed that point cloud data includes a current to-be-encoded point, and the current to-be-encoded point is any to-be-encoded point other than a head point in a target predictive tree. A process of performing geometry prediction for the current to-be-encoded point based on a geometry encoding scheme obtained for the target predictive tree, to obtain predicted geometry information of the current to-be-encoded point may include: obtaining real geometry information of a preceding point that precedes and is adjacent to the current to-be-encoded point in the target predictive tree, and using the real geometry information of the preceding point as the predicted geometry information of the current to-be-encoded point. As shown in a first diagram in FIG. 17, it is assumed that a current to-be-encoded point in a target predictive tree of point cloud data is a point 5, and a preceding point that precedes and is adjacent to the point 5 in the target predictive tree is a point 4. Real geometry information of the point 4 may be determined as predicted geometry information of the point 5.

(3) Geometry prediction is performed for a current to-be-encoded point by using S preceding nodes. A value of S is not limited. For example, in some embodiments, predicted geometry information of the current to-be-encoded point may be calculated based on a plurality of preceding nodes. It is assumed that point cloud data includes a current to-be-encoded point, and the current to-be-encoded point is any to-be-encoded point other than a head point in a target predictive tree. A process of performing geometry prediction for the current to-be-encoded point based on a geometry encoding scheme obtained for the target predictive tree, to obtain predicted geometry information of the current to-be-encoded point may include: obtaining real geometry information of a plurality of preceding points that precede and are adjacent to the current to-be-encoded point in the target predictive tree, and fusing the real geometry information of the plurality of preceding points, to obtain the predicted geometry information of the current to-be-encoded point. A fusion process is not limited. For example, fusion may include but is not limited to differential processing or mean calculation. Obtaining two adjacent preceding points is used as an example. As shown in a second diagram in FIG. 17, it is assumed that a current to-be-encoded point in a target predictive tree of point cloud data is a point 5, and two preceding points that precede and arc adjacent to the point 5 in the target predictive tree are a point 4 and a point 3. Differential processing may be performed on real geometry information of the point 4 and real geometry information of the point 3, and a differential processing result may be determined as predicted geometry information of the point 5.

In addition, the same geometry encoding scheme or different geometry encoding schemes may also be set for a target predictive tree in some embodiments. Manners of setting a geometry encoding scheme for a target predictive tree may include but are not limited to the following:

(1) Consistent geometry encoding schemes are set for point cloud data at an encoding end and a decoding end. For example, a geometry encoding scheme set for the point cloud data at the encoding end may be consistent with a geometry decoding scheme set for encoded point cloud data at the decoding end. An encoding device and a decoding device may store default setting information. The default setting information indicates setting a default geometry encoding scheme for the point cloud data. Based on the default setting information being obtained, a default geometry encoding scheme is set for the point cloud data based on the default setting information. If the default setting information indicates setting the same geometry encoding scheme for point cloud groups of the point cloud data, the same geometry encoding scheme is used for the point cloud groups. If the default setting information indicates setting different geometry encoding schemes for point cloud groups of the point cloud data, different geometry encoding schemes are used for the point cloud groups. The default setting information may be preset in storage space of the encoding device. Based on the encoding device determining to use a geometry encoding scheme for encoding, the encoding device may pull the information directly from the storage space.

In addition, the encoding device may further generate scheme setting information based on the default geometry encoding scheme, and transmit the scheme setting information to the decoding device. The scheme setting information indicates the decoding device to also use a default geometry decoding scheme for decoding encoded point cloud data. The default setting information may be stored in storage space of the decoding device. Based on obtaining to-be-decoded point cloud data, the decoding device may set a default geometry decoding scheme for the to-be-decoded point cloud data directly based on the default setting information stored in the storage space.

(2) The same geometry encoding scheme is set for point cloud groups of point cloud data, and scheme information of the geometry encoding scheme is transmitted to a decoding device. For example, the scheme information of the geometry encoding scheme is written into a parameter set (for example, encoded header information) or an encoded bit stream, so that the scheme information of the geometry encoding scheme is transmitted to the decoding device when the parameter set or the encoded bit stream is transmitted. Based on receiving the scheme information of the geometry encoding scheme, the decoding device may set a geometry decoding scheme for to-be-decoded point cloud data based on the scheme information.

(3) Different geometry encoding schemes are set for point cloud groups of point cloud data, and scheme information of the geometry encoding schemes set for the point cloud groups is transmitted to a decoding device. For example, the scheme information of the geometry encoding schemes is written into a parameter set or an encoded bit stream, so that the scheme information of the geometry encoding schemes is transmitted to the decoding device when the parameter set or the encoded bit stream is transmitted. For example, point cloud data includes a first point cloud group and a second point cloud group. A first geometry encoding scheme set for the first point cloud group indicates performing geometry prediction for a current to-be-encoded point by using a single preceding node, and a second geometry encoding scheme set for the second point cloud group indicates performing geometry prediction for a current to-be-encoded point by using S (S is greater than or equal to 2) preceding nodes. Scheme information of the first geometry encoding scheme and scheme information of the second geometry encoding scheme may be transmitted to a decoding device, so that the decoding device sets geometry decoding schemes for corresponding to-be-decoded point cloud groups based on the scheme information.

(4) A geometry encoding scheme is determined for a target predictive tree based on geometry distribution characteristics of point cloud data. The geometry distribution characteristics of the point cloud data may include the following: distribution characteristics of dimensions of a point cloud bounding box that is of the point cloud data and that is obtained through space partitioning, in an x-direction, a y-direction, and a z-direction; or distribution characteristics of dimensions of point cloud bounding boxes of point cloud groups of the point cloud data in an x-direction, a y-direction, and a z-direction.

In some embodiments, a geometry encoding scheme is determined based on the geometry distribution characteristics of the point cloud bounding box of the point cloud data. For example, the point cloud bounding box of the point cloud data is determined first, which is constructing the point cloud bounding box for the point cloud data based on space partitioning. The point cloud bounding box includes all to-be-encoded points in the point cloud data. In the process of determining the point cloud bounding box of the point cloud data, the dimensions of the point cloud bounding box may be determined based on real geometry information of each point in the point cloud data. The dimensions are the dimensions of the point cloud bounding box in the x-direction, the y-direction, and the z-direction. For calculating the dimensions of the point cloud bounding box, refer to the descriptions of operation 402. If there is a large difference among the dimensions of the point cloud bounding box in the x-direction, the y-direction, and the z-direction, a geometry encoding scheme is determined for the target predictive tree based on the difference. For example, different geometry encoding schemes are set for an x-direction, a y-direction, and a z-direction for a target predictive tree. For example, different geometry encoding schemes are used for different directions for point cloud data, and different geometry encoding schemes may be used for different directions for to-be-encoded points in the point cloud data.

A manner of determining the difference among the dimensions of the point cloud bounding box in the x-direction, the y-direction, and the z-direction may include: subtracting the dimension of the point cloud bounding box in the y-direction from the dimension in the x-direction to obtain a difference, and subtracting the dimension in the z-direction from the difference, to obtain the difference among the dimensions in the x-direction, the y-direction, and the z-direction. If the difference is greater than a difference threshold, it is determined that the difference among the dimensions of the point cloud bounding box in the x-direction, the y-direction, and the z-direction is large. On the contrary, if the difference is less than or equal to a difference threshold, it is determined that the difference among the dimensions of the point cloud bounding box in the x-direction, the y-direction, and the z-direction is small. A process of determining the difference among the dimensions of the point cloud bounding box in the x-direction, the y-direction, and the z-direction is not limited. The subtracting the dimension of the point cloud bounding box in the y-direction from the dimension in the x-direction to obtain a difference, and subtracting the dimension in the z-direction from the difference described above is an example implementation process of determining the difference provided in some embodiments, which is described herein.

Geometry encoding schemes may be determined based on the geometry distribution characteristics of the point cloud groups of the point cloud data. For example, in units of point cloud groups, a geometry encoding scheme may be determined for each point cloud group based on the geometry distribution characteristics of the corresponding point cloud group. The dimensions of the point cloud bounding box of each point cloud group may be first analyzed based on real geometry information of to-be-encoded points in the point cloud group of the point cloud data, and a geometry encoding scheme may be set for the point cloud group based on the geometry distribution characteristics of the point cloud bounding box of the point cloud group. For example, any point cloud group of point cloud data is a target point cloud group. Dimensions of a point cloud bounding box of the target point cloud group may be analyzed based on real geometry information of to-be-encoded points in the target point cloud group. If a difference among the dimensions of the bounding box of the target point cloud group in an x-direction, a y-direction, and a z-direction is greater than a difference threshold, different geometry encoding schemes are set for the x-direction, the y-direction, and the z-direction for a single-chain predictive tree of the target point cloud group. For example, different geometry encoding schemes are used for different directions for the to-be-encoded points included in the target point cloud group. For a manner of determining the difference among the dimensions of the point cloud bounding box of the target point cloud group in the x-direction, the y-direction, and the z-direction, refer to the foregoing related description.

(5) A geometry encoding scheme is determined based on distance statistics of point cloud data. The distance statistics of the point cloud data may be a sum of geometric distances between a plurality of adjacent points in the point cloud data. For example, a sum of geometric distances between a plurality of adjacent points may be calculated. If the sum of the geometric distances is greater than a distance threshold, a specified geometry encoding scheme is set for the point cloud data. For example, a specified geometry encoding scheme indicates performing geometry prediction for a current to-be-encoded point by using S preceding nodes.

The foregoing are several example methods for determining a geometry encoding scheme for a target predictive tree provided in some embodiments, and the example methods do not constitute limitations on the scope of the disclosure.

In conclusion, geometry encoding may be performed on the to-be-encoded points in the point cloud data in some embodiments. Compared with encoding the to-be-encoded points, this can reduce an amount of data to be encoded during geometry information encoding, decrease an amount of compressed data to be transmitted, and further increase efficiency of encoding the point cloud data. In addition, the plurality of geometry encoding schemes are also supported in some embodiments. The same geometry encoding scheme or different geometry encoding schemes may be selected depending on a service requirement, optimizing geometry encoding schemes and increasing efficiency of encoding the point cloud data.

Figure 18:
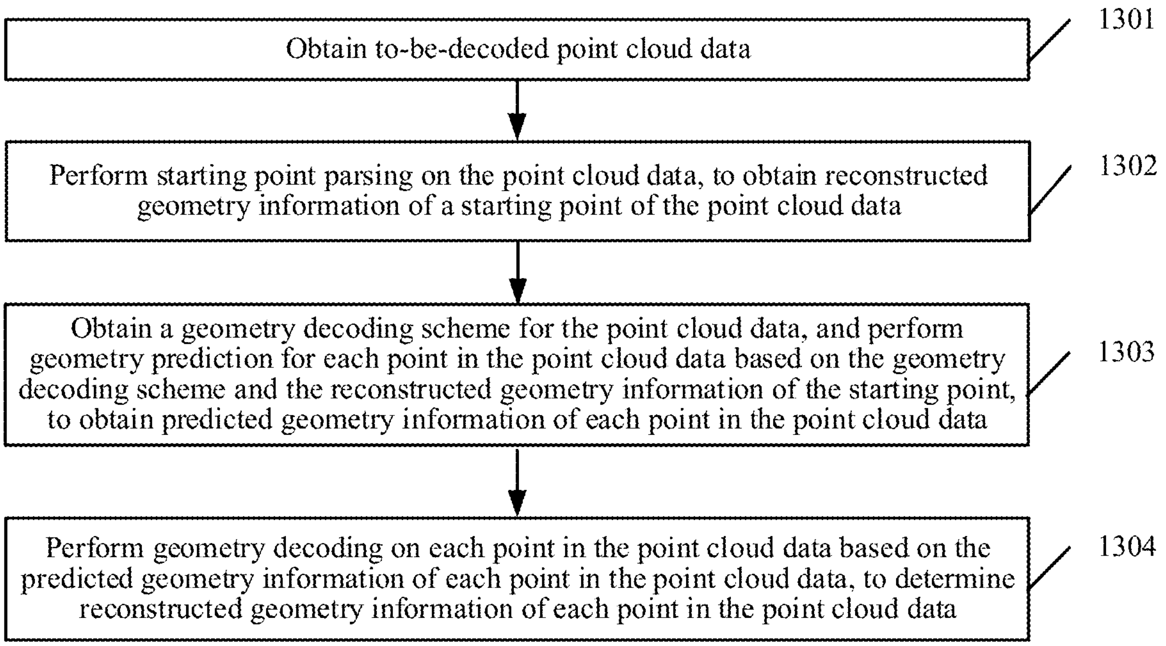
FIG. 18 is a schematic flowchart of a point cloud decoding method according to some embodiments.

Some embodiments provide a point cloud decoding method. For an implementation procedure of the point cloud decoding method, refer to FIG. 18. The point cloud decoding method may be performed by the decoding device 302 in the point cloud encoding and decoding system 30 shown in FIG. 5. As shown in FIG. 18, the point cloud decoding method may include the following operations 1301 to 1304:

1301: Obtain to-be-decoded point cloud data.

The to-be-decoded point cloud data includes a plurality of to-be-decoded points. The to-be-decoded point cloud data may be encoded point cloud data mentioned above and is an encoded bit stream. The to-be-decoded point cloud data is obtained by encoding each to-be-encoded point in to-be-encoded point cloud data by an encoding device based on a single-chain predictive tree of each point cloud group of the point cloud data. The single-chain predictive tree of each point cloud group is constructed based on starting points of each point cloud group. A quantity of the starting points of each point cloud group is greater than 1. Based on encoding the point cloud data, the encoding device may transmit the encoded bit stream to a decoding device. In some encoding and decoding scenarios, an encoding device and a decoding device may be the same device. Based on encoding point cloud data, the encoding device may store encoded point cloud data into storage space. When the decoding device (for example, the encoding device) needs to decode the encoded point cloud data, the decoding device may obtain to-be-decoded point cloud data directly from the storage space.

1302: Perform starting point parsing on the point cloud data, to obtain reconstructed geometry information of the starting point of the point cloud data.

As shown in operation 1104 in some embodiments as shown in FIG. 16, the encoding device some embodiments may encode each to-be-encoded point in the point cloud data by following a plurality of encoding rules, to obtain an encoded bit stream. For example, bounding box information of a point cloud bounding box of point cloud data may be encoded to obtain an encoded bit stream. Starting point information of a first starting point (for example, real geometry information of a first starting point) of the first point cloud group of point cloud data may be encoded to obtain an encoded bit stream. Starting point information of starting points of each point cloud group of point cloud data may be encoded to obtain an encoded bit stream. Correspondingly, because different encoding rules are applied to the point cloud data, the decoding device may perform parsing in different manners to obtain the reconstructed geometry information of the starting point of a target predictive tree.

The following describes implementation processes of performing parsing in a plurality of manners to obtain the reconstructed geometry information of the starting point.

In some embodiments, encoded bounding box information is parsed, to predict the reconstructed geometry information of the starting point of the point cloud data. The to-be-decoded point cloud data is an encoded bit stream, and the encoded bit stream includes the encoded bounding box information. The encoded bounding box information may be parsed, to obtain vertex information of vertices of a point cloud bounding box of the point cloud data. Based on the vertex information of the vertices of the point cloud bounding box, the reconstructed geometry information of the starting point of the point cloud data may be determined.

For example, encoded bounding box information includes vertex information of a vertex (for example, a bottom-left vertex) of a point cloud bounding box and dimensions of the point cloud bounding box in an x-direction, a y-direction, and a z-direction. Based on the encoded bounding box information being parsed, predicted geometry information of one vertex of the point cloud bounding box and the dimensions of the point cloud bounding box in the x-direction, the y-direction, and the z-direction can be directly obtained. In consideration that the point cloud bounding box may be a cuboid or a cube, predicted geometry information of other vertices of the point cloud bounding box can be derived based on the predicted geometry information of one vertex and the dimensions in the x-direction, the y-direction, and the z-direction. Further, because a starting point may be selected from the plurality of vertices of the point cloud bounding box based on starting point selection information, the predicted geometry information of the selected vertex is used as reconstructed geometry information of the starting point. The starting point selection information may be configured to indicate to select P1 vertices from a plurality of vertices of a point cloud bounding box as starting points. The starting point selection information may be stored in the decoding device in a form of a parameter, or may be generated and transmitted to the decoding device by the encoding device based on the encoding device selecting P1 starting points based on the point cloud bounding box.

If the encoded bounding box information is bounding box information of a point cloud bounding box of each point cloud group of the point cloud data, the bounding box information of the point cloud bounding box of each point cloud group may also be parsed, to obtain vertex information of vertices of each point cloud bounding box. Based on the vertex information of the vertices of the point cloud bounding box of each point cloud group, reconstructed geometry information of the starting points of the single-chain predictive tree of each point cloud group is determined. The point cloud groups are obtained by dividing the point cloud data into groups by the encoding device.

Encoded starting point information of the starting point of the target predictive tree may be parsed, to predict the reconstructed geometry information of the starting point of the point cloud data. During implementation, the to-be-decoded point cloud data may be an encoded bit stream, the encoded bit stream may include the encoded starting point information of the starting point of the target predictive tree of the point cloud data, the starting point of the target predictive tree may be a first starting point of the first point cloud group of L point cloud groups, L may be an integer greater than or equal to 1, and the L point cloud groups may be obtained by dividing the point cloud data into groups by an encoding end. The encoded starting point information of the starting point of the target predictive tree may be parsed, and a parsing result may be directly used as the reconstructed geometry information of the starting point of the target predictive tree.

Encoded starting point information of a first starting point of a single-chain predictive tree of each point cloud group of the point cloud data may be parsed, to predict the reconstructed geometry information of the starting point of the point cloud data. During implementation, the to-be-decoded point cloud data may be an encoded bit stream, the encoded bit stream may include the encoded starting point information of the first starting point of each single-chain predictive tree, a single-chain predictive tree may correspond to a point cloud group, the point cloud groups may be obtained by dividing the point cloud data by an encoding end, and the target predictive tree of the point cloud data may be obtained by connecting the single-chain predictive trees of the point cloud groups. The encoded starting point information of the first starting point of the single-chain predictive tree of each of the L point cloud groups may be directly parsed, a result of parsing the starting point information of the first starting point of each single-chain predictive tree is used as reconstructed geometry information of the starting point of the corresponding point cloud group, and the reconstructed geometry information of the starting point of the point cloud data is determined based on the reconstructed geometry information of the starting point of each point cloud group.

A first starting point of a single-chain predictive tree mentioned above may be an ending point of a preceding adjacent single-chain predictive tree. Based on the foregoing description, the target predictive tree of the point cloud data is obtained by connecting the single-chain predictive trees of the L point cloud groups in sequence. For example, a tail point (or referred to as an ending point) of a single-chain predictive tree of an $i^{th}$ point cloud group is connected to a head point (or referred to as a starting point) of a single-chain predictive tree of an $(i+1)^{th}$ point cloud group, where i=1, 2, . . . , L. The ending point of the single-chain predictive tree of the $i^{th}$ point cloud group may be used as a first starting point of the $(i+1)^{th}$ point cloud group. Based on the encoded starting point information of the first starting point of the single-chain predictive tree of each point cloud group being parsed, the reconstructed geometry information of the first starting point of each point cloud group can be directly obtained, enabling geometry prediction that is performed for other points in the corresponding point cloud group based on the reconstructed geometry information of the first starting point.

Because the encoded point cloud data includes different information, the decoding device may predict the reconstructed geometry information of the starting point of the target predictive tree in different manners. The method in which the decoding device predicts the reconstructed geometry information of the starting point is not limited.

1303: Obtain a geometry decoding scheme for the target predictive tree, and perform geometry prediction for each point in the point cloud data based on the geometry decoding scheme and the reconstructed geometry information of the starting point, to obtain predicted geometry information of each point in the point cloud data.

When the reconstructed geometry information of the starting point is known, geometry prediction may be performed for each point in the point cloud data based on the geometry decoding scheme obtained for the point cloud data, to obtain the predicted geometry information of each point. For example, when reconstructed geometry information of the first starting point of a target predictive tree of point cloud data is known, predicted geometry information of other points can be derived in sequence based on the reconstructed geometry information of the first starting point and a geometry decoding scheme. Point cloud data may include encoded point quantity of each point cloud group. Based on the encoded point quantity of each point cloud group being parsed, predicted point quantity information of each point cloud group can be obtained. Based on a geometry decoding scheme, the predicted point quantity information of each point cloud group, and known predicted geometry information of a tail point of a single-chain predictive tree of each point cloud group, predicted geometry information of each point in each point cloud group can be determined. Predicted geometry information of each point in the point cloud data may be obtained. For an $i^{th}$ point cloud group, predicted geometry information of each point in the $i^{th}$ point cloud group can be derived based on the geometry decoding scheme, predicted point quantity information of the $i^{th}$ point cloud group, and predicted geometry information of a tail point of a single-chain predictive tree of an $(i-1)^{th}$ point cloud group. Similar operations may be performed to obtain the predicted geometry information of each point in the point cloud data.

Similar to geometry encoding schemes used by the encoding end, geometry decoding schemes used by a decoding end may include but are not limited to the following:

(1) Geometry prediction is not performed for a to-be-decoded point.

(2) Geometry prediction is performed for a current to-be-decoded point by using a single preceding node (parent point).

3) Geometry prediction is performed for a current to-be-decoded point by using S preceding nodes (for example, a parent point and a grandparent point; or a parent point, a grandparent point, and a grand-grandparent point). It is assumed that in point cloud data or a point cloud group, there are Q points that precede a current to-be-decoded point. A value of S may be 2, 3, 4, . . . , Q−1.

The following describes the example geometry decoding schemes.

(1) For a first starting point in the first position in a target predictive tree, geometry prediction does not need to be performed for the first starting point. It is because predicted geometry information of the first starting point may be obtained by parsing bounding box information described above, or may be obtained by parsing encoded tail point information of a tail point of a single-chain predictive tree, or may be obtained by parsing encoded starting point information of the head point of the target predictive tree.

(2) Geometry prediction is performed for a current to-be-decoded point by using a single preceding node. For example, predicted geometry information of the current to-be-decoded point may be determined based on a single preceding node (or referred to as a preceding point). It is assumed that point cloud data includes a current to-be-decoded point, and the current to-be-decoded point is any to-be-decoded point other than a head point in the point cloud data or a point cloud group. A process of performing geometry prediction for the current to-be-decoded point based on a geometry decoding scheme obtained for a target predictive tree, to obtain predicted geometry information of the current to-be-decoded point may include: obtaining predicted geometry information of a single preceding point that precedes and is adjacent to the current to-be-decoded point in a decoding order, and using the predicted geometry information of the preceding point as the predicted geometry information of the current to-be-decoded point. The decoding order is an order in which an encoding end encodes points in to-be-encoded point cloud data. For example, an order in which an encoding device encodes points in to-be-encoded point cloud data is: a point 1→a point 3→a point 2→a point 5→a point 4. An order in which a decoding device decodes the points in to-be-decoded point cloud data may be determined to be: the point 1→the point 3→the point 2→the point 5→the point 4.

(3) Geometry prediction is performed for a current to-be-decoded point by using S preceding nodes. A value of S is not limited. In some embodiments, predicted geometry information of the current to-be-decoded point may be calculated based on a plurality of preceding nodes. It is assumed that point cloud data includes a current to-be-decoded point, and the current to-be-decoded point is any to-be-decoded point other than a head point in the point cloud data or a point cloud group. A process of performing geometry prediction for the current to-be-decoded point based on a geometry decoding scheme obtained for a target predictive tree, to obtain predicted geometry information of the current to-be-decoded point may include: obtaining predicted geometry information of a plurality of preceding points that precede and are adjacent to the current to-be-decoded point in a decoding order, and fusing the predicted geometry information of the plurality of preceding points, to obtain the predicted geometry information of the current to-be-decoded point. A fusion process is not limited. For example, fusion may include but is not limited to differential processing or mean calculation.

In addition, the same geometry decoding scheme or different geometry decoding schemes may also be set for point cloud data in some embodiments. Manners of setting a geometry decoding scheme may include but are not limited to the following (1) to (5):

(1) Consistent geometry encoding schemes are set for point cloud data at an encoding end and a decoding end. For example, a geometry encoding scheme set for the point cloud data at the encoding end may be consistent with a geometry decoding scheme set for encoded point cloud data at the decoding end. An encoding device and a decoding device may store default setting information. The default setting information indicates setting a default geometry decoding scheme for the point cloud data. Based on the default setting information being obtained, a default geometry decoding scheme is set for the point cloud data based on the default setting information. In a case in which the point cloud data is divided into a plurality of point cloud groups, if the default setting information indicates setting the same geometry decoding scheme for the point cloud groups of the point cloud data, the same geometry decoding scheme is used for the point cloud groups; or if the default setting information indicates setting different geometry decoding schemes for the point cloud groups of the point cloud data, different geometry decoding schemes are used for the point cloud groups. In some embodiments, the default setting information may be preset in storage space of the decoding device. Based on the decoding device determining to use a geometry decoding scheme, the decoding device may pull the information directly from the storage space. In some embodiments, the default setting information may be transmitted by the encoding device to the decoding device. For example, the decoding device may obtain the default setting information from to-be-decoded point cloud data (or referred to as encoded point cloud data), and set a default geometry decoding scheme for a target predictive tree based on the default setting information. The default setting information is set through negotiation between the encoding end and the decoding end.

(2) An encoding scheme set for point cloud data is obtained by parsing a parameter set or an encoded bit stream. When an encoding device sets a same geometry encoding scheme for point cloud groups of point cloud data, and scheme information of the geometry encoding scheme is written into a parameter set or an encoded bit stream, a decoding device may obtain the scheme information from the parameter set or the encoded bit stream, and set a same geometry decoding scheme for the point cloud groups of the point cloud data based on the scheme information.

(3) An encoding scheme set for each point cloud group of point cloud data is obtained by parsing a parameter set or an encoded bit stream. When an encoding device sets different geometry encoding schemes for point cloud groups of point cloud data, and scheme information of the geometry encoding schemes set for the point cloud groups is written into a parameter set or an encoded bit stream, a decoding device may set a corresponding geometry decoding scheme for each point cloud group based on the received scheme information of the point cloud groups.

(4) A geometry decoding scheme is determined for point cloud data based on geometry distribution characteristics of the point cloud data. The geometry distribution characteristics of the point cloud data may include the following: distribution characteristics of dimensions of a point cloud bounding box that is of the point cloud data and that is obtained through space partitioning, in an x-direction, a y-direction, and a z-direction; or distribution characteristics of dimensions of point cloud bounding boxes of point cloud groups of the point cloud data in an x-direction, a y-direction, and a z-direction.

In some embodiments, a geometry decoding scheme is determined based on the geometry distribution characteristics of the point cloud bounding box of the point cloud data. First, the dimensions of the point cloud bounding box of the point cloud data are determined. The dimensions of the point cloud bounding box of the point cloud data in the x-direction, the y-direction, and the z-direction may be obtained by directly parsing encoded bounding box information. For parsing the bounding box information of the point cloud bounding box, refer to the foregoing related description. If there is a large difference among the dimensions of the point cloud bounding box of the point cloud data in the x-direction, the y-direction, and the z-direction, for example, the difference is greater than a difference threshold, different geometry decoding schemes are set for the x-direction, the y-direction, and the z-direction for the point cloud data. For example, different geometry decoding schemes are used for different directions for the point cloud data, and different geometry decoding schemes may be used for different directions for to-be-decoded points in the point cloud data.

A manner of determining the difference among the dimensions of the point cloud bounding box in the x-direction, the y-direction, and the z-direction may include: subtracting the dimension of the point cloud bounding box in the y-direction from the dimension in the x-direction to obtain a difference, and subtracting the dimension in the z-direction from the difference, to obtain the difference among the dimensions in the x-direction, the y-direction, and the z-direction. If the difference is greater than the difference threshold, it is determined that the difference among the dimensions of the point cloud bounding box in the x-direction, the y-direction, and the z-direction is large. On the contrary, if the difference is less than or equal to the difference threshold, it is determined that the difference among the dimensions of the point cloud bounding box in the x-direction, the y-direction, and the z-direction is small. A process of determining the difference among the dimensions of the point cloud bounding box in the x-direction, the y-direction, and the z-direction is not limited. The subtracting the dimension of the point cloud bounding box in the y-direction from the dimension in the x-direction to obtain a difference, and subtracting the dimension in the z-direction from the difference described above is an example implementation process of determining the difference provided in some embodiments, which is described herein.

Geometry decoding schemes may be determined based on the geometry distribution characteristics of the point cloud groups of the point cloud data. For example, in units of point cloud groups, a geometry decoding scheme may be determined for each point cloud group based on the geometry distribution characteristics of the corresponding point cloud group. First, the dimensions of the point cloud bounding boxes of the point cloud data are determined. The dimensions of the point cloud bounding boxes of the point cloud data in the x-direction, the y-direction, and the z-direction may be obtained by directly parsing encoded bounding box information. For parsing the bounding box information of the point cloud bounding boxes, refer to the foregoing related description. A geometry decoding scheme is set for each point cloud group based on the geometry distribution characteristics of the point cloud bounding box of the point cloud group. For example, any point cloud group of point cloud data is a target point cloud group. If a difference among dimensions of a bounding box of the target point cloud group in an x-direction, a y-direction, and a z-direction is greater than a difference threshold, different geometry decoding schemes are set for the x-direction, the y-direction, and the z-direction for the target point cloud group. For example, different geometry decoding schemes are used for different directions for to-be-decoded points included in the target point cloud group. For a manner of determining the difference among the dimensions of the point cloud bounding box of the target point cloud group in the x-direction, the y-direction, and the z-direction, refer to the foregoing related description.

(5) A geometry decoding scheme is determined based on distance statistics of point cloud data. The distance statistics of the point cloud data may be a sum of distances between a plurality of adjacent points in the point cloud data. The sum may be a sum of absolute values of reconstructed residual information of a plurality of adjacent points. The reconstructed residual information of each point may be obtained by parsing encoded prediction residual information in an encoded bit stream. For example, an encoding device may encode prediction residual information of each point, so that a decoding device parses encoded prediction residual information of each point to obtain the reconstructed residual information of each point. A sum of reconstructed residual information of a plurality of adjacent points may be calculated. If the sum of the reconstructed residual information is greater than a distance threshold, a specified geometry decoding scheme is set for the point cloud data. For example, a specified geometry decoding scheme indicates performing geometry prediction for a current to-be-decoded point by using S preceding nodes.

The foregoing are several example methods for determining a geometry decoding scheme provided in some embodiments, and the example methods do not constitute any limitation on the scope of the disclosure.

1304: Perform geometry decoding on each point in the point cloud data based on the predicted geometry information of each point in the point cloud data, to determine reconstructed geometry information of each point in the point cloud data.

In some embodiments, the point cloud data further includes encoded prediction residual information of each point. The prediction residual information of any point is obtained by subtracting the predicted geometry information of the any point from real geometry information of the any point by the encoding device. Based on receiving the encoded point cloud data, the decoding device parses the encoded prediction residual information of each point in the point cloud data, to obtain reconstructed residual information of each point. Further, the decoding device may perform geometry decoding on each to-be-decoded point in the point cloud data based on the reconstructed residual information and predicted geometry information of each point, to determine the reconstructed geometry information of each point in the point cloud data. For example, the decoding device adds reconstructed residual information and predicted geometry information of any point together, to obtain reconstructed geometry information of the any point.

In some embodiments, based on the to-be-decoded point cloud data being obtained, starting point parsing may be performed on the point cloud data, to determine the reconstructed geometry information of the starting point of the target predictive tree of the point cloud data; geometry prediction is performed for each to-be-decoded point in the point cloud data based on the geometry decoding scheme determined for the point cloud data and the reconstructed geometry information of the starting point, to obtain the predicted geometry information of each to-be-decoded point; and geometry decoding is performed on each point in the point cloud data based on the predicted geometry information of each point in the point cloud data, to determine the reconstructed geometry information of each point in the point cloud data. In the foregoing process, starting point parsing is performed on the point cloud data. The reconstructed geometry information of the starting point of the target predictive tree of the point cloud data is directly obtained. For example, the reconstructed geometry information of the starting point is determined quickly, increasing efficiency of decoding the point cloud data.

The foregoing describes the methods according to some embodiments. The following describes an apparatus according to some embodiments.

Figure 19:
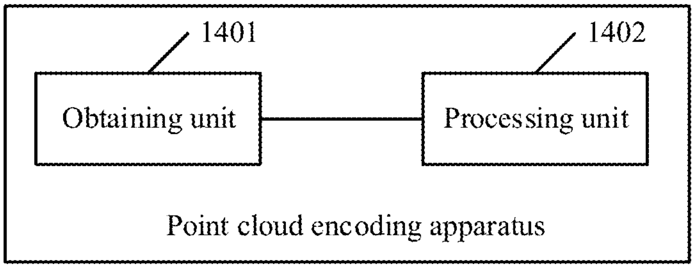
FIG. 19 is a diagram of a structure of a point cloud encoding apparatus according to some embodiments.

FIG. 19 is a diagram of a structure of a point cloud encoding apparatus according to some embodiments. The point cloud encoding apparatus may be disposed in a computer device provided in some embodiments. The computer device may be the encoding device as described with the method according to some embodiments. In some embodiments, the point cloud encoding apparatus may be a computer program (including program code) running in a computer device. The point cloud encoding apparatus may be configured to perform corresponding operations in the method according to some embodiments as shown in FIG. 6 or FIG. 16. With reference to FIG. 19, the point cloud encoding apparatus may include the following units:

an obtaining unit 1401, configured to obtain to-be-encoded point cloud data, the point cloud data being a set in units of points, the point cloud data being divided into L point cloud groups, L being an integer greater than or equal to 1, and each point cloud group including a plurality of to-be-encoded points; and a processing unit 1402, configured to determine a starting point for each point cloud group, a quantity of the starting points of each point cloud group being greater than or equal to 1;

the processing unit 1402 being further configured to construct a single-chain predictive tree for each point cloud group based on the starting point of the point cloud group; and the processing unit 1402 being further configured to encode each to-be-encoded point in the point cloud data based on the single-chain predictive tree of each point cloud group.

A manner of determining the starting points of the point cloud groups may include one or more of the following:

selecting a starting point from a plurality of vertices of a point cloud bounding box of a point cloud group;

selecting a starting point from one or more first identified points in a point cloud group, the first identified point being a point that is in the point cloud group and whose geometric distance is greater than a distance threshold; or selecting a starting point based on an arrangement order of to-be-encoded points in a point cloud group.

The manner of determining the starting points of the point cloud groups may include the selecting a starting point from a plurality of vertices of a point cloud bounding box of a point cloud group, any one of the L point cloud groups is a target point cloud group, and when being configured to select a starting point for the target point cloud group, the processing unit 1402 may be configured to:

determine a point cloud bounding box for the target point cloud group, the point cloud bounding box of the target point cloud group including a smallest cuboid, a smallest cube, or a smallest polyhedron that encompasses all points in the target point cloud group; and select P1 starting points from a plurality of vertices of the point cloud bounding box of the target point cloud group according to a selection rule, P1 being greater than or equal to 1, and the selection rule including at least one of the following: performing selection randomly, performing selection based on geometric distance relationships between vertices, and performing selection in a preset direction.

The manner of determining the starting points of the point cloud groups may include the selecting a starting point from one or more first identified points in a point cloud group, any one of the L point cloud groups is a target point cloud group, and when being configured to select a starting point for the target point cloud group, the processing unit 1402 may be configured to:

determine one or more first identified points from a plurality of to-be-encoded points included in the target point cloud group, the first identified point including at least one of maximum points, minimum points, and median points of the target point cloud group; and select P2 starting points from the maximum points, the minimum points, and the median points, P2 being greater than or equal to 1.

The manner of determining the starting points of the point cloud groups may include the selecting a starting point based on an arrangement order of to-be-encoded points in a point cloud group, any one of the L point cloud groups is a target point cloud group, and when being configured to select a starting point for the target point cloud group, the processing unit 1402 may be configured to:

determine one or more second identified points based on an arrangement order of to-be-encoded points in the target point cloud group, the second identified point including at least one of a head point in the arrangement order and a tail point in the arrangement order; and select P3 starting points from the one or more second identified points, P3 being greater than or equal to 1.

One of the L point cloud groups may be a target point cloud group, and when being configured to select a starting point for the target point cloud group, the processing unit 1402 may be configured to:

determine a first starting point for the target point cloud group, the first starting point being determined in any one of the following manners: determined based on a plurality of vertices of a point cloud bounding box of the target point cloud group, or determined from one or more first identified points in the target point cloud group, or determined based on an arrangement order of to-be-encoded points in the target point cloud group; and select a starting point from the points in the target point cloud group based on a geometric positional relationship between the first starting point and each point in the target point cloud group.

The L point cloud groups may include an $m^{th}$ point cloud group and an $(m+1)^{th}$ point cloud group, one or more starting points may be selected for the $m^{th}$ point cloud group, and when being configured to select a starting point for the $(m+1)^{th}$ point cloud group, the processing unit 1402 may be configured to:

select a starting point from the one or more starting points of the $m^{th}$ point cloud group according to a screening rule for the $(m+1)^{th}$ point cloud group, the screening rule including any one of the following: performing selection randomly, or selecting a starting point with a lowest priority from the one or more starting points of the $m^{th}$ point cloud group.

One of the L point cloud groups may be a target point cloud group, starting points of the target point cloud group may include at least a first starting point and a second starting point, and when being configured to construct a single-chain predictive tree for the target point cloud group based on the first starting point and the second starting point, the processing unit 1402 may be configured to:

determine points other than the starting points in the target point cloud group as candidate points, and add the candidate points to a set of alternative points; and construct the single-chain predictive tree for the target point cloud group based on the set of alternative points, the first starting point, and the second starting point, a starting point of the single-chain predictive tree being the first starting point, and an ending point being the second starting point.

A priority of the first starting point may be higher than a priority of the second starting point, and when being configured to construct the single-chain predictive tree for the target point cloud group based on the set of alternative points, the first starting point, and the second starting point, the processing unit 1402 may be configured to:

construct a first branch chain of the single-chain predictive tree of the target point cloud group based on the first starting point and the set of alternative points, and construct a second branch chain of the single-chain predictive tree of the target point cloud group based on the second starting point and the set of alternative points; and connect a tail point on the first branch chain with a higher priority to a tail point on the second branch chain with a lower priority, to obtain the single-chain predictive tree of the target point cloud group.

When being configured to construct a first branch chain of the single-chain predictive tree of the target point cloud group based on the first starting point and the set of alternative points, and when constructing a second branch chain of the single-chain predictive tree of the target point cloud group based on the second starting point and the set of alternative points, the processing unit 1402 may be configured to:

search, with the first starting point with a higher priority as a search starting point, the set of alternative points for a first candidate point that is at a shortest geometric distance from the first starting point, connect the first candidate point to the first branch chain that uses the first starting point as a head point, and update the set of alternative points based on the first candidate point;

search, with the second starting point with a lower priority as a search starting point, the updated set of alternative points for a second candidate point that is at a shortest geometric distance from the second starting point, connect the second candidate point to the second branch chain that uses the second starting point as a head point, and update the updated set of alternative points based on the second candidate point; and repeat the foregoing operations until the set of alternative points is an empty set, to obtain the first branch chain and the second branch chain of the single-chain predictive tree of the target point cloud group.

A priority of the first starting point may be higher than a priority of the second starting point, and when being configured to construct the single-chain predictive tree for the target point cloud group based on the set of alternative points, the first starting point, and the second starting point, the processing unit 1402 may be configured to:

search, with the first starting point as a search starting point, the set of alternative points for a first candidate point that has a smallest weighted sum of a distance between the first candidate point and the search starting point and a distance between the first candidate point and the second starting point, connect the first candidate point to the search starting point, and update the set of alternative points based on the first candidate point;

search, with the first candidate point as a new search starting point, the updated set of alternative points for a second candidate point that has a smallest weighted sum of a distance between the second candidate point and the search starting point and a distance between the second candidate point and the second starting point, connect the second candidate point to the new search starting point, and update the set of alternative points based on the second candidate point;

continue to search for a candidate point with the second candidate point as a new search starting point until the set of alternative points is an empty set; and connect the last found candidate point to the second starting point, to obtain the single-chain predictive tree of the target point cloud group.

The processing unit 1402 may be further configured to:

order the plurality of to-be-encoded points included in the point cloud data, to obtain a point cloud sequence; and add a target quantity of adjacent points to a point cloud group based on an arrangement order of the points in the point cloud sequence, to obtain the L point cloud groups, when an $(L-1)^{th}$ point cloud group is obtained through division, if a quantity of ungrouped points remaining in the point cloud sequence is less than the target quantity, the remaining ungrouped points being added to an $L^{th}$ point cloud group; or when an $L^{th}$ point cloud group is obtained through division, if a quantity of ungrouped points remaining in the point cloud sequence is less than the target quantity, the remaining ungrouped points being added to the $L^{th}$ point cloud group.

When being configured to encode each to-be-encoded point in the point cloud data based on the single-chain predictive tree of each point cloud group, the processing unit 1402 may be configured to:

connect the single-chain predictive trees of the point cloud groups sequentially in an order in which the L point cloud groups are obtained through division, to obtain a target predictive tree of the point cloud data; and encode each to-be-encoded point in the point cloud data based on the target predictive tree, to obtain an encoded bit stream, a starting point of the target predictive tree being a first starting point of the first point cloud group of the L point cloud groups, and an ending point of the target predictive tree being an ending point of the $L^{th}$ point cloud group of the L point cloud groups.

The L point cloud groups may include a $j^{th}$ point cloud group and a $(j+1)^{th}$ point cloud group that are adjacent to each other, j=1, 2, . . . , L−1, and when being configured to connect the single-chain predictive trees of the point cloud groups sequentially in an order in which the L point cloud groups are obtained through division, to obtain a target predictive tree of the point cloud data, the processing unit 1402 may be configured to:

connect a tail point of a single-chain predictive tree of the $j^{th}$ point cloud group to a head point of a single-chain predictive tree of the $(j+1)^{th}$ point cloud group, to obtain the target predictive tree of the point cloud data.

When being configured to encode each to-be-encoded point in the point cloud data based on the target predictive tree, to obtain an encoded bit stream, the processing unit 1402 may be configured to:

determine bounding box information of a point cloud bounding box of the point cloud data, and encode the bounding box information;

obtain a geometry encoding scheme for the target predictive tree, and encode each to-be-encoded point in the point cloud data based on the geometry encoding scheme; and obtain the encoded bit stream based on the encoded bounding box information and the encoded point cloud data.

When being configured to encode each to-be-encoded point in the point cloud data based on the target predictive tree, to obtain an encoded bit stream, the processing unit 1402 may be configured to:

encode starting point information of the starting point of the target predictive tree, the starting point of the target predictive tree being the first starting point of the first point cloud group of the L point cloud groups;

obtain a geometry encoding scheme for the target predictive tree, and encode each to-be-encoded point in the point cloud data based on the geometry encoding scheme; and obtain the encoded bit stream based on the encoded starting point information of the starting point of the target predictive tree and the encoded point cloud data.

An ending point of a single-chain predictive tree of a $j^{th}$ point cloud group in the point cloud data may be used as a first starting point of a single-chain predictive tree of a $(j+1)^{th}$ point cloud group, j=1, 2, . . . , L−1, and when being configured to encode each to-be-encoded point in the point cloud data based on the target predictive tree, to obtain an encoded bit stream, the processing unit 1402 may be configured to:

encode starting point information of the first starting point of each single-chain predictive tree and group information of each point cloud group;

obtain a geometry encoding scheme for the target predictive tree, and encode each to-be-encoded point in the point cloud data based on the geometry encoding scheme; and obtain the encoded bit stream based on the encoded starting point information of the first starting point of each single-chain predictive tree, the encoded group information of each point cloud group, and the encoded point cloud data.

When being configured to encode each to-be-encoded point in the point cloud data based on the geometry encoding scheme, the processing unit 1402 may be configured to:

perform geometry prediction for each point in the point cloud data based on the geometry encoding scheme obtained for the target predictive tree, to obtain predicted geometry information of each point in the point cloud data;

determine prediction residual information of each point in the point cloud data based on the predicted geometry information and real geometry information of each point in the point cloud data; and encode the prediction residual information of each point in the point cloud data, to obtain the encoded point cloud data.

The point cloud data may include a current to-be-encoded point, the current to-be-encoded point may be any to-be-encoded point other than the starting point in the target predictive tree, and when being configured to perform geometry prediction for the current to-be-encoded point based on the geometry encoding scheme obtained for the target predictive tree, to obtain predicted geometry information of the current to-be-encoded point, the processing unit 1402 may be configured to perform at least one of the following:

obtaining real geometry information of a single preceding point that precedes and is adjacent to the current to-be-encoded point in the target predictive tree, and using the real geometry information of the preceding point as the predicted geometry information of the current to-be-encoded point; or obtaining real geometry information of a plurality of preceding points that precede and are adjacent to the current to-be-encoded point in the target predictive tree, and fusing the real geometry information of the plurality of preceding points, to obtain the predicted geometry information of the current to-be-encoded point.

When being configured to obtain a geometry encoding scheme for the target predictive tree, the processing unit 1402 may be configured to:

obtain default setting information, and set a default geometry encoding scheme for the target predictive tree based on the default setting information, the default setting information being set through negotiation between an encoding end and a decoding end; or set a same geometry encoding scheme for the point cloud groups of the point cloud data, scheme information of the geometry encoding scheme being written into a parameter set or the encoded bit stream; or set different geometry encoding schemes for the point cloud groups of the point cloud data, scheme information of the geometry encoding schemes being written into a parameter set or the encoded bit stream; or determine a geometry encoding scheme for the target predictive tree based on geometry distribution characteristics of the point cloud data; or determine a geometry encoding scheme for the target predictive tree based on distance statistics of the point cloud data.

When being configured to determine a geometry encoding scheme for the target predictive tree based on geometry distribution characteristics of the point cloud data, the processing unit 1402 may be configured to:

determine dimensions of the point cloud bounding box of the point cloud data based on real geometry information of each point in the point cloud data; and determine, if a difference among the dimensions of the point cloud bounding box of the point cloud data in an x-direction, a y-direction, and a z-direction is greater than a difference threshold, a geometry encoding scheme for the target predictive tree based on the difference.

When being configured to determine a geometry encoding scheme for the target predictive tree based on geometry distribution characteristics of the point cloud data, the processing unit 1402 may be configured to:

determine dimensions of a point cloud bounding box of the target point cloud group based on real geometry information of each point in the target point cloud group; and set, if a difference among the dimensions of the bounding box of a target point cloud group in an x-direction, a y-direction, and a z-direction is greater than a difference threshold, different geometry encoding schemes for the x-direction, the y-direction, and the z-direction for a single-chain predictive tree of the target point cloud group.

Figure 20:
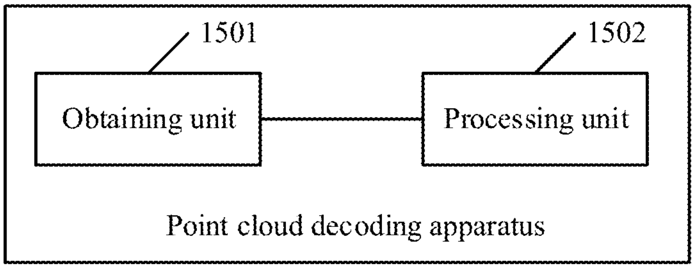
FIG. 20 is a diagram of a structure of a point cloud decoding apparatus according to some embodiments.

FIG. 20 is a diagram of a structure of a point cloud decoding apparatus according to some embodiments. The point cloud decoding apparatus may be disposed in a computer device provided in some embodiments. The computer device may be the decoding device mentioned in the foregoing method according to some embodiments. In some embodiments, the point cloud decoding apparatus may be a computer program (including program code) running in a computer device. The point cloud decoding apparatus may be configured to perform corresponding operations in the method according to some embodiments as shown in FIG. 18. With reference to FIG. 20, the point cloud decoding apparatus may include the following units:

an obtaining unit 1501, configured to obtain to-be-decoded point cloud data, the point cloud data including a plurality of to-be-decoded points, the to-be-decoded point cloud data being obtained by encoding each to-be-encoded point in to-be-encoded point cloud data by an encoding end based on a single-chain predictive tree of each point cloud group of the point cloud data, the single-chain predictive tree of each point cloud group being constructed based on a starting point of each point cloud group, and a quantity of the starting points of each point cloud group being greater than or equal to 1; and a processing unit 1502, configured to perform starting point parsing on the point cloud data, to obtain reconstructed geometry information of the starting point of the point cloud data;

the processing unit 1502 being further configured to: determine a geometry decoding scheme for the point cloud data, and perform geometry prediction for each point in the point cloud data based on the geometry decoding scheme and the reconstructed geometry information of the starting point, to obtain predicted geometry information of each point in the point cloud data; and the processing unit 1502 being further configured to perform geometry decoding on each point in the point cloud data based on the predicted geometry information of each point in the point cloud data, to determine reconstructed geometry information of each point in the point cloud data.

The to-be-decoded point cloud data may be an encoded bit stream. The encoded bit stream may include encoded bounding box information. The encoded bit stream may be obtained by encoding each point in the to-be-encoded point cloud data by the encoding end, and when being configured to perform starting point parsing on the point cloud data, to obtain reconstructed geometry information of the starting point of the point cloud data, the processing unit 1502 may be configured to:

parse the encoded bounding box information, to obtain vertex information of vertices of a point cloud bounding box of the point cloud data; and determine the reconstructed geometry information of the starting point of the point cloud data based on the vertex information of the vertices of the point cloud bounding box.

The to-be-decoded point cloud data may be an encoded bit stream. The encoded bit stream may include encoded starting point information of a starting point of a target predictive tree of the point cloud data. The encoded bit stream may be obtained by encoding each point in the to-be-encoded point cloud data by the encoding end. The starting point of the target predictive tree may be a first starting point of the first point cloud group of L point cloud groups. L may be an integer greater than or equal to 1. The L point cloud groups may be obtained by dividing the point cloud data into groups by the encoding end, and when being configured to perform starting point parsing on the point cloud data, to obtain reconstructed geometry information of the starting point of the point cloud data, the processing unit 1502 may be configured to:

parse the encoded starting point information of the starting point of the target predictive tree of the point cloud data; and use a parsing result as the reconstructed geometry information of the starting point of the point cloud data.

The to-be-decoded point cloud data may be an encoded bit stream. The encoded bit stream may include encoded starting point information of a first starting point of each single-chain predictive tree. The encoded bit stream may be obtained by encoding each point in the to-be-encoded point cloud data by the encoding end. A single-chain predictive tree may correspond to a point cloud group The point cloud groups may be obtained by dividing the point cloud data into groups by the encoding end.

When being configured to perform starting point parsing on the point cloud data, to obtain reconstructed geometry information of the starting point of the point cloud data, the processing unit 1502 may be configured to:

parse the encoded starting point information of the first starting point of each single-chain predictive tree; and use a result of parsing the starting point information of the first starting point of each single-chain predictive tree, as reconstructed geometry information of the starting point of the corresponding point cloud group.

The encoded bit stream may include encoded group information of each point cloud group. Group information of a point cloud group may include at least a quantity of points included in the point cloud group and a group identifier of the point cloud group.

When being configured to perform geometry prediction for each point in the point cloud data based on the geometry decoding scheme and the reconstructed geometry information of the starting point, to obtain predicted geometry information of each point in the point cloud data, the processing unit 1502 may be configured to:

parse the encoded group information of each point cloud group, to obtain predicted group information of each point cloud group; and determine predicted geometry information of each point in each point cloud group based on the geometry decoding scheme, the predicted group information of each point cloud group, and the reconstructed geometry information of the starting point of each point cloud group, to obtain the predicted geometry information of each point in the point cloud data.

The point cloud data may include a current to-be-decoded point. The current to-be-decoded point may be a to-be-decoded point other than the starting point in the point cloud data. When being configured to perform geometry prediction for the current to-be-decoded point based on the geometry decoding scheme, to obtain predicted geometry information of the current to-be-decoded point, the processing unit 1502 may be configured to:

obtain predicted geometry information of a single preceding point that precedes and is adjacent to the current to-be-decoded point in a decoding order, and use the predicted geometry information of the preceding point as the predicted geometry information of the current to-be-decoded point; or obtain predicted geometry information of a plurality of preceding points that precede and are adjacent to the current to-be-decoded point in a decoding order, and fuse the predicted geometry information of the plurality of preceding points, to obtain the predicted geometry information of the current to-be-decoded point, the decoding order being an order in which the encoding end encodes points in the to-be-encoded point cloud data.

When being configured to obtain a geometry decoding scheme for the point cloud data, the processing unit 1502 may be configured to perform at least one of the following:

obtaining default setting information, and setting a default geometry decoding scheme for the point cloud data based on the default setting information, the default setting information being set through negotiation between the encoding end and a decoding end; or parsing scheme information that is in a parameter set or an encoded bit stream, and setting a same geometry decoding scheme for the point cloud data based on the scheme information; or parsing scheme information that is in a parameter set or an encoded bit stream, and setting different geometry decoding schemes for the point cloud groups of the point cloud data based on the scheme information, the point cloud groups being obtained by dividing the point cloud data into groups by the encoding end; or determining a geometry decoding scheme for the point cloud data based on geometry distribution characteristics of the point cloud data; or determining a geometry decoding scheme for the point cloud data based on distance statistics of the point cloud data.

In some embodiments, an encoded bit stream includes encoded bounding box information, the encoded bit stream is obtained by encoding each point in the to-be-encoded point cloud data by the encoding end, and when being configured to determine a geometry decoding scheme for the point cloud data based on geometry distribution characteristics of the point cloud data, the processing unit 1502 may be configured to:

parse the encoded bounding box information, to obtain dimensions of a point cloud bounding box of the point cloud data; and determine, if a difference among the dimensions of the point cloud bounding box of the point cloud data in an x-direction, a y-direction, and a z-direction is greater than a difference threshold, a geometry decoding scheme for the point cloud data based on the difference.

In some embodiments, an encoded bit stream includes encoded bounding box information of each point cloud group, any point cloud group is a target point cloud group, the encoded bit stream is obtained by encoding each point in the to-be-encoded point cloud data by the encoding end, and when being configured to determine a geometry decoding scheme for the point cloud data based on geometry distribution characteristics of the point cloud data, the processing unit 1502 may be configured to:

parse the encoded bounding box information of the target point cloud group, to obtain dimensions of a point cloud bounding box of the target point cloud group; and set, if a difference among the dimensions of the bounding box of the target point cloud group in an x-direction, a y-direction, and a z-direction is greater than a difference threshold, different geometry decoding schemes for the x-direction, the y-direction, and the z-direction for the target point cloud group.

According to some embodiments, each unit may exist respectively or be combined into one or more units. Some units may be further split into multiple smaller function subunits, thereby implementing the same operations without affecting the technical effects of some embodiments. The units are divided based on logical functions. In actual applications, a function of one unit may be realized by multiple units, or functions of multiple units may be realized by one unit. In some embodiments, the apparatus may further include other units. In actual applications, these functions may also be realized cooperatively by the other units, and may be realized cooperatively by multiple units.

A person skilled in the art would understand that these "units" could be implemented by hardware logic, a processor or processors executing computer software code, or a combination of both. The "units" may also be implemented in software stored in a memory of a computer or a non-transitory computer-readable medium, where the instructions of each unit are executable by a processor to thereby cause the processor to perform the respective operations of the corresponding unit.

Figure 21:
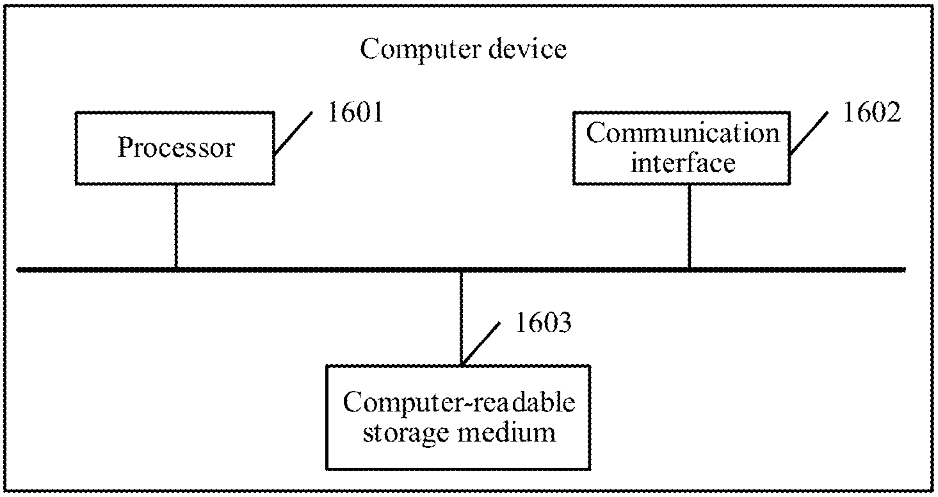
FIG. 21 is a diagram of a structure of a computer device according to some embodiments.

FIG. 21 is a diagram of a structure of a computer device according to some embodiments. With reference to FIG. 21, the computer device includes a processor 1601, a communication interface 1602, and a computer-readable storage medium 1603. The processor 1601, the communication interface 1602, and the computer-readable storage medium 1603 may be connected by using a bus or in other manners. The communication interface 1602 may be configured to receive and transmit data. The computer-readable storage medium 1603 may be stored in a memory in a computer device. The computer-readable storage medium 1603 may be configured to store a computer program, with the computer program including program instructions. The processor 1601 may be configured to execute the program instructions stored in the computer-readable storage medium 1603. The processor 1601 (or referred to as a central processing unit (CPU)) is a computing core and a control core of a computer device and may implement one or more instructions. For example, the processor 1601 may load and execute one or more instructions to implement corresponding method procedures or corresponding functions.

Some embodiments provide a computer-readable storage medium (memory). The computer-readable storage medium is a storage device in a computer device and may be configured to store programs and data. The computer-readable storage medium herein may include both a storage medium built in the computer device and an extended storage medium supported by the computer device. The computer-readable storage medium provides storage space. In the storage space, a processing system of the computer device is stored. In addition, one or more instructions to be loaded and executed by the processor 1601 are also stored in the storage space. The instructions may be one or more computer programs (including program code). The computer-readable storage medium herein may be a high-speed random access memory (RAM), or may be a non-volatile memory, for example, at least one magnetic disk memory. In some embodiments, the computer-readable storage medium herein may be at least one computer-readable storage medium located away from the processor.

In some embodiments, the computer-readable storage medium stores one or more instructions. The processor 1601 loads and executes the one or more instructions stored in the computer-readable storage medium, to implement corresponding operations in the point cloud encoding methods according to some embodiments. During implementation, the one or more instructions in the computer-readable storage medium are loaded and executed by the processor 1601 to implement the following operations:

obtaining to-be-encoded point cloud data, the point cloud data being divided into L point cloud groups, L being an integer greater than or equal to 1, and each point cloud group including a plurality of to-be-encoded points;

determining a starting point for each point cloud group, a quantity of the starting points of each point cloud group being greater than or equal to 1;

constructing a single-chain predictive tree for each point cloud group based on the starting point of the point cloud group; and encoding each to-be-encoded point in the point cloud data based on the single-chain predictive tree of each point cloud group.

Some embodiments provide a computer program product or a computer program. The computer program product or the computer program includes computer instructions. The computer instructions are stored in a computer-readable storage medium. A processor in a computer device reads the computer instructions from the computer-readable storage medium. The processor executes the computer instructions, so that the computer device performs the point cloud encoding method or the point cloud decoding method.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure and the appended claims.

What is claimed is:

1. A point cloud encoding method, performed by an encoding device, comprising:

obtaining point cloud data, comprising one or more point cloud groups, wherein the one or more point cloud groups comprise a first plurality of points;

determining one or more starting points for the one or more point cloud groups, wherein the one or more point cloud groups comprise a target point cloud group including a first starting point and a second starting point;

constructing, based on the one or more starting points, one or more single-chain predictive trees for the one or more point cloud groups, the one or more single-chain predictive trees comprising no branch chains, wherein the constructing the one or more single-chain predictive trees comprises constructing a first single-chain predictive tree for the target point cloud group based on the first starting point and the second starting point, wherein a first priority of the first starting point is higher than a second priority of the second starting point, and wherein the constructing the first single-chain predictive tree comprises:

constructing a first branch chain of the first single-chain predictive tree based on the first starting point and a set of alternative points, constructing a second branch chain of the first single-chain predictive tree based on the second starting point and the set of alternative points, and connecting a first tail point on the first branch chain with a first higher priority to a second tail point on the second branch chain with a first lower priority, to obtain the first single-chain predictive tree;

encoding the first plurality of points based on the one or more single-chain predictive trees; and transmitting the encoded first plurality of points.

2. The method according to claim 1, wherein the determining the one or more starting points comprises at least one of:

selecting a first starting point from a first plurality of vertices of a first point cloud bounding box of a first point cloud group of the one or more point cloud groups;

selecting a second starting point, whose geometric distance is greater than a distance threshold, from one or more second identified points in a second point cloud group of the one or more point cloud groups; or selecting a third starting point based on an arrangement order of a third plurality of points of a third point cloud group of the one or more point cloud groups.

3. The method according to claim 2, wherein the determining the one or more starting points comprises the selecting the first starting point, wherein the one or more point cloud groups comprise a target point cloud group, wherein the selecting the first starting point comprises selecting one or more fourth starting points of the target point cloud group, wherein the selecting the one or more fourth starting points comprises:

determining a fourth point cloud bounding box for the target point cloud group, comprising at least one of a smallest cuboid, a smallest cube, or a smallest polyhedron encompassing a fourth plurality of points in the target point cloud group; and selecting the one or more fourth starting points from a plurality of vertices of the fourth point cloud bounding box of the target point cloud group based on a selection rule, and wherein the selection rule comprises at least one of:

selecting the one or more fourth starting points randomly, selecting the one or more fourth starting points based on geometric distance relationships between the plurality of vertices, or selecting the one or more fourth starting points in a preset direction.

4. The method according to claim 2, wherein the determining the one or more starting points comprises the selecting the second starting point, wherein the one or more point cloud groups comprise a target point cloud group, wherein the selecting the second starting point comprises selecting one or more fifth starting points for the target point cloud group, and wherein the selecting the one or more fifth starting points comprises selecting one or more fifth identified starting points from a fifth plurality of points in the target point cloud group from at least one of:

one or more maximum points of the target point cloud group, one or more minimum points of the target point cloud group, or one or more median points of the target point cloud group.

5. The method according to claim 2, wherein the determining the one or more starting points comprises the selecting the third starting point, wherein the one or more point cloud groups comprise a target point cloud group, wherein the selecting the third starting point comprises selecting one or more sixth starting points for the target point cloud group, wherein the selecting the one or more sixth starting points comprises determining one or more sixth identified points based on a sixth arrangement order of a plurality of sixth points in the target point cloud group, and wherein the one or more sixth identified points comprise at least one of:

a sixth head point in the sixth arrangement order, or a sixth tail point in the sixth arrangement order.

6. The method according to claim 1, wherein the one or more point cloud groups comprise a target point cloud group, and wherein the determining the one or more starting points comprises:

determining a first starting point for the target point cloud group, based on at least one of:

a plurality of vertices of a point cloud bounding box of the target point cloud group, one or more first identified points in the target point cloud group, or an arrangement order of a second plurality of points in the target point cloud group; and selecting a starting point from the second plurality of points based on a geometric positional relationship between the first starting point and the second plurality of points.

7. The method according to claim 1, wherein the one or more point cloud groups comprise an $m^{th}$ point cloud group and an $(m+1)^{th}$ point cloud group, and m is an integer, wherein the determining the one or more starting points comprises:

selecting one or more first starting points for the $m^{th}$ point cloud group;

selecting a second starting point for the $(m+1)^{th}$ point cloud group wherein the selecting the second starting point comprises selecting a third starting point from the one or more first starting points based on a screening rule for the $(m+1)^{th}$ point cloud group, and wherein the screening rule comprises at least one of:

selecting the third starting point randomly, or selecting the third starting point based on a lowest priority from the one or more first starting points.

8. The method according to claim 1, wherein one or more third starting points of the target point cloud group comprise the first starting point and the second starting point, wherein the constructing the first single-chain predictive tree comprises:

determining one or more fourth points other than the one or more third starting points as candidate points; and constructing the first single-chain predictive tree based on the set of alternative points, the first starting point, and the second starting point, the set of alternative points comprising the candidate points, wherein a fifth starting point of the first single-chain predictive tree is the first starting point, and wherein a fifth ending point of the first single-chain predictive tree is the second starting point.

9. The method according to claim 8, wherein the constructing the first branch chain comprises:

searching, with the first starting point with a second higher priority as a first search starting point, the set of alternative points for a first candidate point that is at a first shortest geometric distance from the first starting point, connecting the first candidate point to a third branch chain that uses the first starting point as a first head point, and updating the set of alternative points based on the first candidate point;

wherein the constructing the second branch chain comprises:

searching, with the second starting point with a second lower priority as a second search starting point, the updated set of alternative points for a second candidate point that is at a second shortest geometric distance from the second starting point, connecting the second candidate point to a fourth branch chain that uses the second starting point as a second head point; and updating the updated set of alternative points based on the second candidate point, and wherein the constructing the first branch chain and the constructing the second branch chain are repeated until the set of alternative points is an empty set.

10. A point cloud encoding apparatus, configured in an encoding device, comprising:

at least one non-transitory memory configured to store program code; and at least one processor configured to read the program code and operate as instructed by the program code, the program code comprising:

obtaining code configured to cause at least one of the at least one processor to obtain point cloud data comprising one or more point cloud groups, wherein the one or more point cloud groups comprise a first plurality of points;

determining code configured to cause at least one of the at least one processor to determine one or more starting points for the one or more point cloud groups, wherein the one or more point cloud groups comprise a target point cloud group including a first starting point and a second starting point, and wherein a first priority of the first starting point is higher than a second priority of the second starting point;

constructing code configured to cause at least one of the at least one processor to:

construct, based on the one or more starting points, one or more single-chain predictive trees for the one or more point cloud groups, the one or more single-chain predictive trees comprising no branch chains, construct a first single-chain predictive tree for the target point cloud group based on first constructing code, wherein the first constructing code is configured to cause at least one of the at least one processor to:

construct a first branch chain of the first single-chain predictive tree based on the first starting point and a set of alternative points;

construct a second branch chain of the first single-chain predictive tree based on the second starting point and the set of alternative points; and connect a first tail point on the first branch chain with a first higher priority to a second tail point on the second branch chain with a first lower priority, to obtain the first single-chain predictive tree;

encoding code configured to cause at least one of the at least one processor to encode the first plurality of points based on the one or more single-chain predictive trees; and transmitting code configured to cause at least one of the at least one processor to transmit the encoded first plurality of points.

11. The point cloud encoding apparatus according to claim 10, wherein the determining code comprises at least one of:

first selecting code configured to cause at least one of the at least one processor to select a first starting point from a first plurality of vertices of a first point cloud bounding box of a first point cloud group of the one or more point cloud groups;

second selecting code configured to cause at least one of the at least one processor to select a second starting point, whose geometric distance is greater than a distance threshold, from one or more second identified points in a second point cloud group of the one or more point cloud groups; or third selecting code configured to cause at least one of the at least one processor to select a third starting point based on an arrangement order of a third plurality of points of a third point cloud group of the one or more point cloud groups.

12. The point cloud encoding apparatus according to claim 11, wherein the determining code comprises the first selecting code, wherein the one or more point cloud groups comprise a target point cloud group, wherein the first selecting code is configured to cause at least one of the at least one processor to select one or more fourth starting points of the target point cloud group based on fourth selecting code, wherein the fourth selecting code is configured to cause at least one of the at least one processor to:

determine a fourth point cloud bounding box for the target point cloud group, comprising at least one of a smallest cuboid, a smallest cube, or a smallest polyhedron encompassing a fourth plurality of points in the target point cloud group; and select the one or more fourth starting points from a plurality of vertices of the fourth point cloud bounding box of the target point cloud group based on a selection rule, and wherein the selection rule comprises at least one of:

selecting the one or more fourth starting points randomly, selecting the one or more fourth starting points based on geometric distance relationships between the plurality of vertices, or selecting the one or more fourth starting points in a preset direction.

13. The point cloud encoding apparatus according to claim 11, wherein the determining code comprises the second selecting code, wherein the one or more point cloud groups comprise a target point cloud group, wherein the second selecting code is configured to cause at least one of the at least one processor to select one or more fifth starting points for the target point cloud group based on fifth selecting code, and wherein the fifth selecting code is configured to cause at least one of the at least one processor to select the one or more fifth identified starting points from a fifth plurality of points in the target point cloud group from at least one of:

one or more maximum points of the target point cloud group, one or more minimum points of the target point cloud group, or one or more median points of the target point cloud group.

14. The point cloud encoding apparatus according to claim 11, wherein the determining code comprises the third selecting code, wherein the one or more point cloud groups comprise a target point cloud group, wherein the third selecting code is configured to cause at least one of the at least one processor to select one or more sixth starting points for the target point cloud group based on sixth selecting code, wherein the sixth selecting code is configured to cause at least one of the at least one processor to determine one or more sixth identified points based on a sixth arrangement order of a plurality of sixth points in the target point cloud group, and wherein the one or more sixth identified points comprise at least one of:

a sixth head point in the sixth arrangement order, or a sixth tail point in the sixth arrangement order.

15. The point cloud encoding apparatus according to claim 10, wherein the one or more point cloud groups comprise a target point cloud group, and wherein the determining code is configured to cause at least one of the at least one processor to:

determine a first starting point for the target point cloud group, based on at least one of:

a plurality of vertices of a point cloud bounding box of the target point cloud group, one or more first identified points in the target point cloud group, or an arrangement order of a second plurality of points in the target point cloud group; and select a starting point from the second plurality of points based on a geometric positional relationship between the first starting point and the second plurality of points.

16. The point cloud encoding apparatus according to claim 10, wherein the one or more point cloud groups comprise an $m^{th}$ point cloud group and an $(m+1)^{th}$ point cloud group, and m is an integer, wherein the determining code comprises first selecting code and second selecting code, wherein the first selecting code is configured to cause at least one of the at least one processor to select one or more first starting points for the $m^{th}$ point cloud group, wherein the second selecting code is configured to cause at least one of the at least one processor to select a second starting point for the $(m+1)^{th}$ point cloud group based on third selecting code, wherein the third selecting code is configured to cause at least one of the at least one processor to select a third starting point from the one or more first starting points based on a screening rule for the $(m+1)^{th}$ point cloud group, and wherein the screening rule comprises at least one of:

selecting the third starting point randomly, or selecting the third starting point based on a lowest priority from the one or more first starting points.

17. The point cloud encoding apparatus according to claim 10, wherein the one or more point cloud groups comprise a target point cloud group, wherein one or more third starting points of the target point cloud group comprise the first starting point and the second starting point, wherein the constructing code is configured to cause at least one of the at least one processor to construct a first single-chain predictive tree for the target point cloud group based on first constructing code, wherein the first constructing code is configured to cause at least one of the at least one processor to:

determine one or more fourth points other than the one or more third starting points as candidate points;

construct the first single-chain predictive tree based on the set of alternative points, the first starting point, and the second starting point, the set of alternative points comprising the candidate points, wherein a fifth starting point of the first single-chain predictive tree is the first starting point, and wherein a fifth ending point of the first single-chain predictive tree is the second starting point.

18. A non-transitory computer-readable storage medium, storing computer code which, when executed by at least one processor, causes the at least one processor to at least:

obtain point cloud data comprising one or more point cloud groups, wherein the one or more point cloud groups comprise a first plurality of points;

determine one or more starting points for the one or more point cloud groups, wherein the one or more point cloud groups comprise a target point cloud group including a first starting point and a second starting point;

construct, based on the one or more starting points, one or more single-chain predictive trees for the one or more point cloud groups, the one or more single-chain predictive trees comprising no branch chains, wherein the constructing the one or more single-chain predictive trees comprises constructing a first single-chain predictive tree for the target point cloud group based on the first starting point and the second starting point, wherein a first priority of the first starting point is higher than a second priority of the second starting point, and wherein the constructing the first single-chain predictive tree comprises:

constructing a first branch chain of the first single-chain predictive tree based on the first starting point and a set of alternative points, constructing a second branch chain of the first single-chain predictive tree based on the second starting point and the set of alternative points, and connecting a first tail point on the first branch chain with a first higher priority to a second tail point on the second branch chain with a first lower priority, to obtain the first single-chain predictive tree;

encode the first plurality of points based on the one or more single-chain predictive trees; and transmit the encoded first plurality of points.

* * * * *